US008843410B2

(12) United States Patent
Blount et al.

(10) Patent No.: US 8,843,410 B2
(45) Date of Patent: Sep. 23, 2014

(54) SYSTEMS, METHODS, AND COMPUTER PROGRAM PRODUCTS FOR SUPPLY CHAIN FINANCE

(75) Inventors: Calvin E. Blount, Atlanta, GA (US); Raymond A. Reulbach, Lawrenceville, GA (US); Humberto Castillo, Marietta, GA (US); Brian A. Cronin, Dunwoody, GA (US); Bryan K. Preston, Tyrone, GA (US); Christopher M. Vukas, Roswell, GA (US)

(73) Assignee: United Parcel Services of America, Inc., Atlanta, GA (US)

( * ) Notice: Subject to any disclaimer, the term of this patent is extended or adjusted under 35 U.S.C. 154(b) by 894 days.

(21) Appl. No.: 12/018,190

(22) Filed: Jan. 22, 2008

(65) Prior Publication Data

US 2009/0187482 A1    Jul. 23, 2009

(51) Int. Cl.
*G06Q 40/00* (2012.01)
*G06Q 40/02* (2012.01)
*G06Q 30/02* (2012.01)

(52) U.S. Cl.
CPC .............. *G06Q 40/02* (2013.01); *G06Q 40/025* (2013.01); *G06Q 30/0207* (2013.01)
USPC .............................................. 705/38; 705/39

(58) Field of Classification Search
CPC ..... G06Q 40/04; G06Q 40/00; G06Q 10/087; G06Q 10/08; G06Q 40/025; G06Q 40/10; G06Q 40/06; G06Q 10/083; G06Q 10/0635; G06Q 20/28
See application file for complete search history.

(56) References Cited

U.S. PATENT DOCUMENTS

| | | | |
|---|---|---|---|
| 5,717,989 A | 2/1998 | Tozzoli et al. | |
| 5,852,811 A * | 12/1998 | Atkins | 705/36 R |
| 6,094,642 A | 7/2000 | Stephenson et al. | |
| 6,151,588 A | 11/2000 | Tozzoli et al. | |
| 6,167,385 A | 12/2000 | Hartley-Urquhart | |
| 6,671,673 B1 | 12/2003 | Baseman et al. | |
| 6,807,533 B1 | 10/2004 | Land et al. | |

(Continued)

FOREIGN PATENT DOCUMENTS

WO    WO 01/09782 A3    2/2001
WO    WO 2004/001639 A2    12/2003

OTHER PUBLICATIONS http://www.law.cornell.edu/ucc/ucc.table.html.*

(Continued)

*Primary Examiner* — F. Zeender
*Assistant Examiner* — Dana Amsdell
(74) *Attorney, Agent, or Firm* — Sutherland Asbill & Brennan LLP

(57) ABSTRACT

Systems and methods for providing supply chain financing that include receiving a request to finance an asset of a borrower, where the asset is associated with goods provided by a supplier to a buyer under the control of a supply chain/logistics entity. Attributes of a trade ecosystem of the supplier and/or the buyer are evaluated to determine whether to finance the asset. Financing of the asset is then established based upon the analyzed attributes of the trade ecosystem, where the terms of the financing permit control over movement of goods before and/or after default of the terms of the financing. Information associated with movement of the goods is monitored and analyzed to determine adjustments to at least one of the financing terms based on the information associated with movement of the goods.

33 Claims, 16 Drawing Sheets

(56) References Cited

U.S. PATENT DOCUMENTS

| | | | |
|---|---|---|---|
| 6,845,909 B2 | 1/2005 | Knowles et al. | |
| 6,850,643 B1 | 2/2005 | Smith, II et al. | |
| 6,850,908 B1* | 2/2005 | Smith et al. | 705/38 |
| 7,016,764 B2 | 3/2006 | Penkar et al. | |
| 7,155,409 B1* | 12/2006 | Stroh | 705/37 |
| 7,191,142 B1 | 3/2007 | Sandell et al. | |
| 7,249,069 B2* | 7/2007 | Alie et al. | 705/28 |
| 7,249,074 B1 | 7/2007 | Land et al. | |
| 7,567,912 B2* | 7/2009 | Viarengo et al. | 705/333 |
| 7,822,656 B2* | 10/2010 | Knight et al. | 705/35 |
| 7,822,682 B2* | 10/2010 | Arnold et al. | 705/39 |
| 8,065,231 B1* | 11/2011 | Loy | 705/40 |
| 2001/0034681 A1 | 10/2001 | Abbott et al. | |
| 2002/0019761 A1* | 2/2002 | Lidow | 705/10 |
| 2002/0023047 A1 | 2/2002 | Noju | |
| 2002/0099579 A1 | 7/2002 | Stowell et al. | |
| 2002/0099655 A1 | 7/2002 | Melchior et al. | |
| 2002/0116332 A1 | 8/2002 | Sanchez | |
| 2002/0138412 A1 | 9/2002 | Englert | |
| 2002/0143669 A1 | 10/2002 | Scheer | |
| 2002/0143696 A1 | 10/2002 | Wilson et al. | |
| 2002/0184127 A1* | 12/2002 | Callioni et al. | 705/35 |
| 2002/0198808 A1 | 12/2002 | Myers | |
| 2003/0074273 A1 | 4/2003 | Miller et al. | |
| 2003/0110104 A1 | 6/2003 | King et al. | |
| 2003/0172007 A1 | 9/2003 | Helmolt et al. | |
| 2003/0195784 A1 | 10/2003 | Smith, Jr. | |
| 2003/0236735 A1 | 12/2003 | Brennan et al. | |
| 2004/0014398 A1 | 1/2004 | Zhang et al. | |
| 2004/0064382 A1 | 4/2004 | Negron | |
| 2004/0064398 A1* | 4/2004 | Browne et al. | 705/37 |
| 2004/0111346 A1 | 6/2004 | Macbeath et al. | |
| 2005/0021425 A1 | 1/2005 | Casey | |
| 2005/0075899 A1* | 4/2005 | Corcoran et al. | 705/1 |
| 2005/0131785 A1 | 6/2005 | Yap | |
| 2006/0015421 A1 | 1/2006 | Grimberg | |
| 2006/0053063 A1 | 3/2006 | Nagar | |
| 2006/0064344 A1 | 3/2006 | Lidow | |
| 2006/0080195 A1 | 4/2006 | Karabulut | |
| 2006/0095367 A1* | 5/2006 | Iverson | 705/39 |
| 2006/0095374 A1 | 5/2006 | Lo et al. | |
| 2006/0116940 A1 | 6/2006 | Dippold et al. | |
| 2006/0149668 A1 | 7/2006 | Zafrir | |
| 2006/0277129 A1 | 12/2006 | Johnston et al. | |
| 2007/0016518 A1* | 1/2007 | Atkinson et al. | 705/38 |
| 2007/0016519 A1 | 1/2007 | Blount, Jr. et al. | |
| 2007/0055624 A1 | 3/2007 | Lundvik et al. | |
| 2007/0061219 A1 | 3/2007 | Palestrant et al. | |
| 2007/0156584 A1* | 7/2007 | Barnes et al. | 705/40 |
| 2007/0192216 A1* | 8/2007 | Arnold et al. | 705/28 |
| 2008/0120218 A1* | 5/2008 | Reid et al. | 705/37 |
| 2009/0144070 A1* | 6/2009 | Psota et al. | 705/1 |

OTHER PUBLICATIONS

Global Trade Review, Trade Services & the Supply Chain Corporate Profile, Sep./Oct. 2006, "UPS Capital: From Supply Chain to Eco-System," www.gtreview.com, pp. 52-53 (2 pages).

Brown, 2006, "Supply Chain Management & Its Effect on International Trade . . . Has Inventory Become a Four-Letter Word?," GMAC Commercial Finance, vol. 4, No. 3 (2 pages).

Bernabucci, Sep. 2006, "New Instruments and New Institutions to Underwrite Global Transactions," World Trade Magazine, www.worldtrademag.com (2 pages).

Gresham Computing, 2006, "A New Model in Supply Chain Financing," www.gresham-computing.com (4 pages).

Pereira, 2006, "International Factoring," The Federation of International Trade Associations (3 pages).

International Search Report with Written Opinion for PCT/US08/51740 dated May 6, 2008 (8 pages).

\* cited by examiner

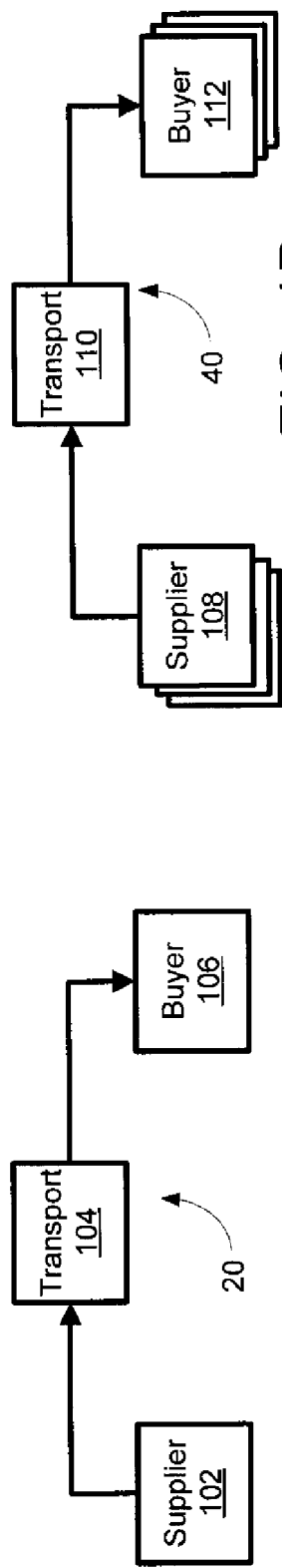
FIG. 1A
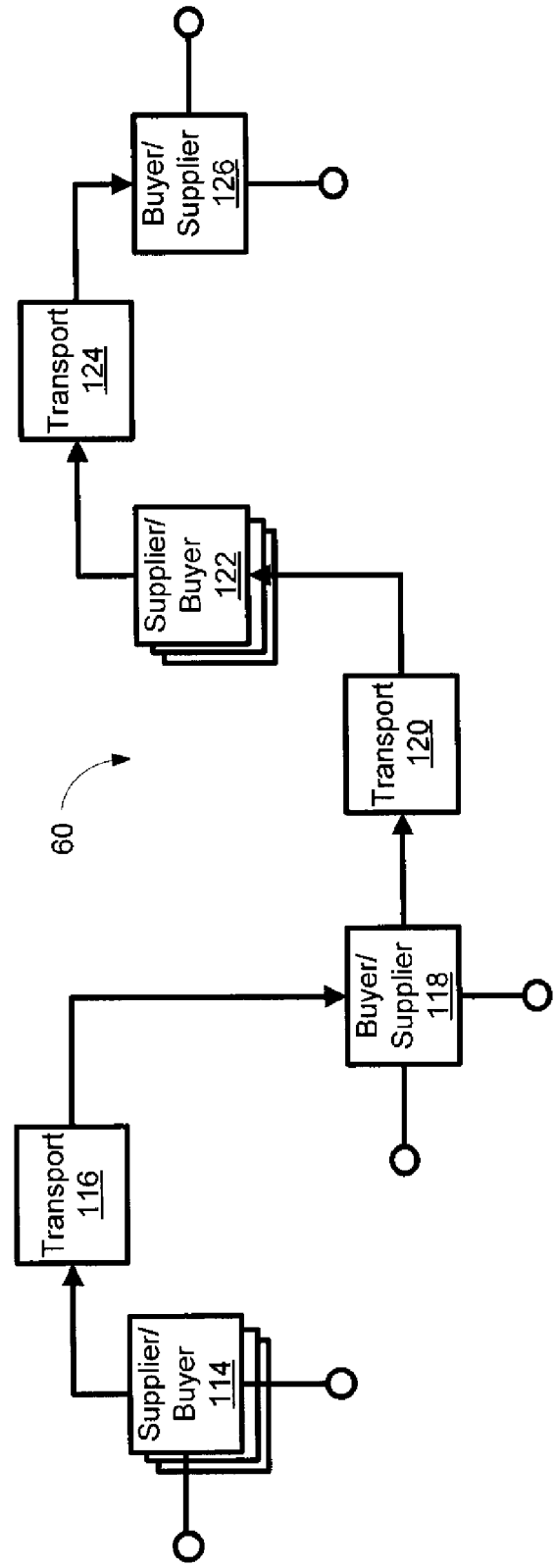
FIG. 1B
FIG. 1C

SYSTEMS, METHODS, AND COMPUTER PROGRAM PRODUCTS FOR SUPPLY CHAIN FINANCE

FIELD OF THE INVENTION

The invention relates generally to supply chain finance, and more particularly, to systems, methods, and computer program products for providing flexible funding opportunities through the convergence of the physical supply chain with the financial supply chain.

BACKGROUND OF THE INVENTION

Many manufacturing supply chains have quickly grown more complex, as one or more operations become outsourced, perhaps to foreign countries. For example, these operations have been outsourced as a result of companies working to lower manufacturing costs by taking advantage of cheaper materials and labor costs in foreign countries. While outsourcing drives down the manufacturing costs, there is often an offsetting increase in financing costs associated with outsourced operations. More specifically, the increase in financing costs may be due, at least in part, to risks associated with doing business with unknown suppliers, many of whom have no previous relationship with the buyers or financial institutions. Therefore, the increase in financing costs oftentimes offsets at least a portion of the reduced manufacturing costs. Suppliers, including foreign and/or domestic suppliers, that must shoulder a larger portion of the financing costs will generally pass along part of the financing costs to the buyer. At the very least, the cost of financing the buyer's and supplier's operations in the supply chain are not optimized.

Compounding the problems associated with financing the operations of the participants in global supply chains is that many asset-based financial solutions offered by lenders and other financial institutions do not consider offshore and/or in-transit inventory. That is, many lenders and other financial institutions are unwilling to consider offshore and/or in-transit inventory as part of a borrower's lending base or collateral. Even where offshore and/or in-transit inventory may be considered part of a borrower's lending base or collateral, the borrowers may receive less than optimal interest rates and advance rates because lenders and other financial institutions remain wary of the inherent risks of global trade (e.g., country risk, in country lien perfection issues, lack of control and visibility of inventory, unknown or unstable foreign suppliers, etc.) as well as the inherent difficulties of seizing inventory used as collateral due to a variety of factors including foreign legal jurisdiction issues, logistic issues, the velocity of the physical supply chain, etc.

Moreover, with global trade, many buyers are forcing suppliers to shoulder the cost of financing for longer periods of time. For example, many domestic buyers are requesting that foreign suppliers move away from burdensome letters of credit to open account terms. With open account terms, suppliers may not receive payment or financing for their goods until well after the goods are received by the domestic buyers.

SUMMARY OF THE INVENTION

According to embodiments of the invention, there is disclosed both a system and a method for providing supply chain financing. The system included a memory for storing executable instructions and a processor in communication with the memory, where the processor is operable to execute the stored executable instructions to receive a request to finance an asset of a borrower, where the asset is associated with inventory provided by a supplier to a buyer under control of a supply chain/logistics entity. The processor is further operable to execute the stored executable instructions to communicate the request for financing to a lender, where the lender evaluates attributes of a trade ecosystem associated with the supplier and the buyer to determine one or more financing terms for the asset. The processor is further operable to execute the stored executable instructions to receive acceptance of the request for financing from the lender, where at least one term of the financing terms permits the lender control over movement of the inventory both before and after default of the plurality of financing terms. The method for providing supply chain financing describes a process similar to the one executed by the processor.

In accordance with one aspect of the invention, the borrower is at least one of the supplier or the buyer. According to another aspect of the invention, the attributes of the trade ecosystem are associated with one or more of (i) the supplier, (ii) the buyer, (iii) a relationship between the supplier and the buyer, or (iv) the goods provided from the supplier and the buyer. In accordance with one aspect of the invention, the processor is further operable to execute the stored instructions to collect payment at a time earlier than specified in the plurality of terms of financing, wherein the collected payment is a discounted payment. According to yet another aspect of the invention, control over movement of the inventory includes either stopping further movement of the inventory or redirecting movement of the inventory.

In accordance with another aspect of the invention, the supply chain/logistics entity is the lender. According to another aspect of the invention, the asset is associated with at least one of an accounts payable, an accounts receivable, or inventory. In accordance with yet another aspect of the invention, the inventory includes in-transit inventory. According to yet another aspect of the invention, the inventory includes inventory located in at least one of a warehouse, bonded logistics park, or free trade zone. In accordance with another aspect of the invention, the processor is further operable to execute the stored instructions to purchase the accounts receivable by a lender at a discount. According to another aspect of the invention, the lender receives payments associated with the accounts receivable.

According to another embodiment of the invention, there is disclosed a system for providing supply chain financing, where the system includes a memory for storing executable instructions and a processor in communication with the memory. The processor is operable to execute the stored executable instructions to evaluate attributes of a trade ecosystem associated with a supplier and a buyer to determine whether to finance an asset of a borrower, where the asset is associated with inventory provided by the supplier to the buyer under the control of a supply chain/logistics entity. The processor is further operable to execute the stored executable instructions to provide the financing of the asset based at least in part on the evaluated attributes, where the financing is adjustable based on information relating to the inventory obtained by the supply chain/logistics entity. The processor is further operable to execute the stored executable instructions to receive information associated with movement of the inventory from the supply chain/logistics entity, and in response to receiving information associated with movement of the inventory, automatically adjust at least one term of financing based on the information associated with movement of the inventory.

In accordance with one aspect of the invention, the borrower is at least one of the supplier and the buyer. According to another aspect of the invention, the processor receives information associated with movement of the inventory from the supply chain/logistics company, and the processor automatically adjusts at least one term of financing based on the information associated with movement of the inventory in substantially real time. In accordance with another aspect of the invention, the inventory includes in-transit inventory located in at least one of a warehouse, bonded logistics center, or free trade zone. According to yet another aspect of the invention, the information associated with movement of the inventory includes at least one of location information, identifying information for the inventory, or valuation information for the inventory. In accordance with yet another aspect of the invention, one or more terms of financing permit control over movement of the inventory upon default of one or more terms of financing.

According to another aspect of the invention, one or more terms of financing permit the supply chain/logistics entity to obtain ownership of the inventory upon default of at least one term of financing. In accordance with another aspect of the invention, automatic adjustment of one or more terms of financing based on the information associated with movement of the inventory includes adjusting at least an advance rate associated with the borrower. According to yet another aspect of the invention, the supply chain/logistics entity is at least one of the entities transporting the inventory from the supplier to the buyer. In accordance with yet another aspect of the invention, the supply chain/logistics entity provides an audit of the financing for a lender associated with the financing. According to another aspect of the invention, one or more terms of financing provide that a supplier receives funds from the supply chain/logistics entity and the supply chain/logistics entity takes a collateral interest in the inventory, where the inventory is shipped in one or more containers.

BRIEF DESCRIPTION OF THE DRAWINGS

Having thus described the invention in general terms, reference will now be made to the accompanying drawings, which are not necessarily drawn to scale, and wherein:

FIGS. 1A-1C illustrate trade ecosystems in accordance with example embodiments of the invention.

Figure 2:
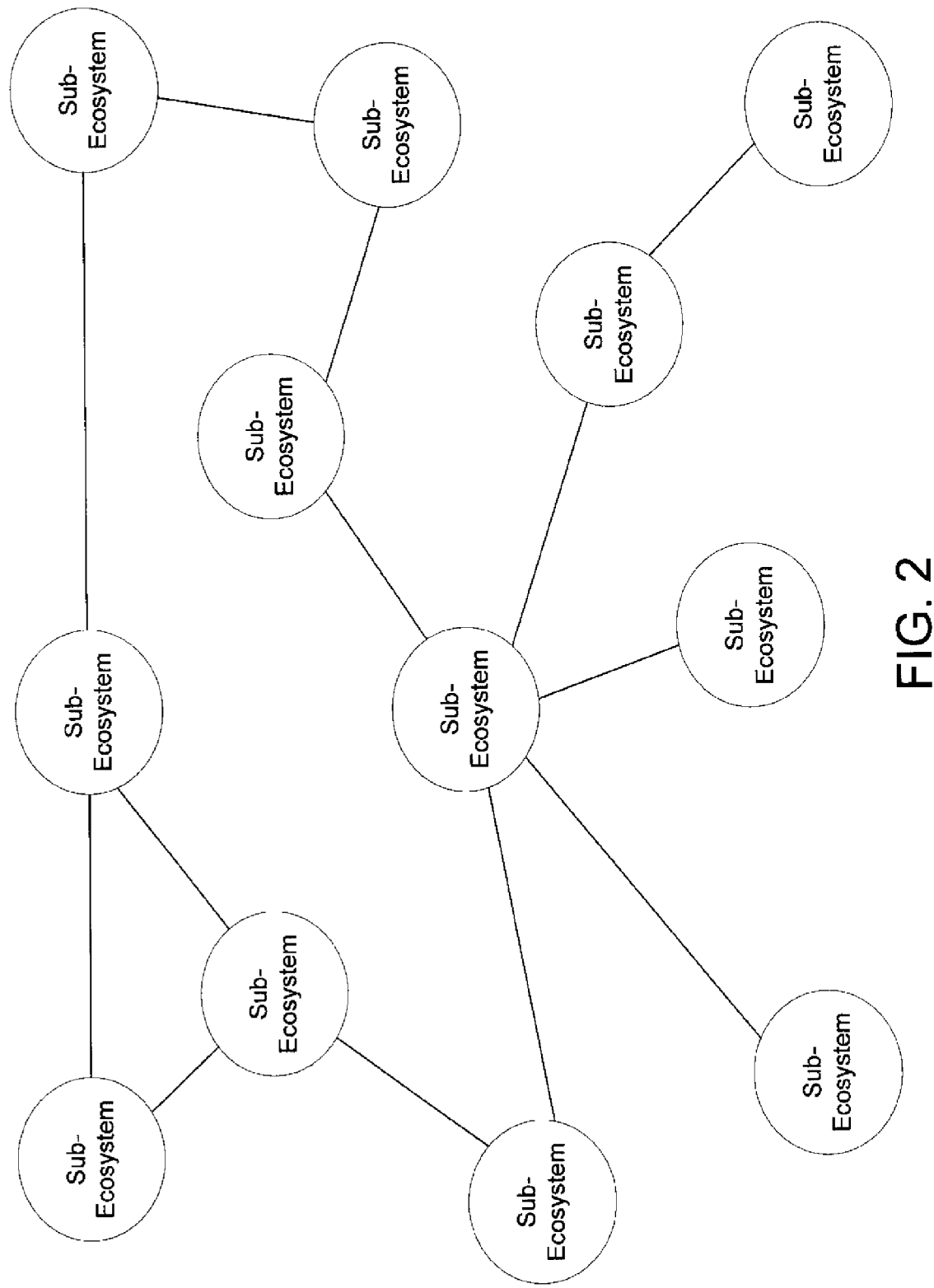

FIG. 2 illustrates a web of a plurality of related sub-ecosystems, according to an example embodiment of the invention.

Figure 3:
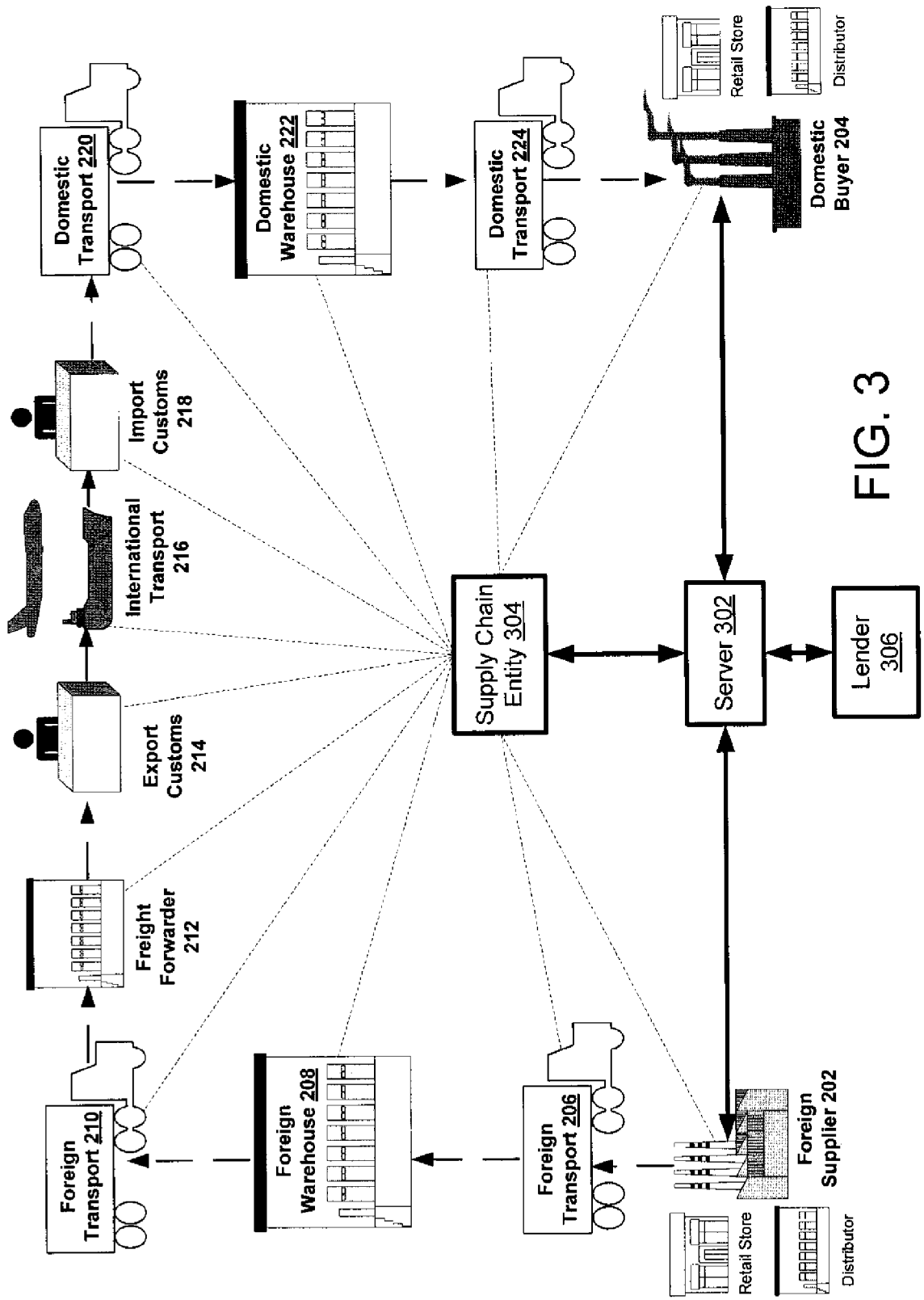

FIG. 3 illustrates a system for monitoring an example supply chain, according to an example embodiment of the invention.

Figure 4A:
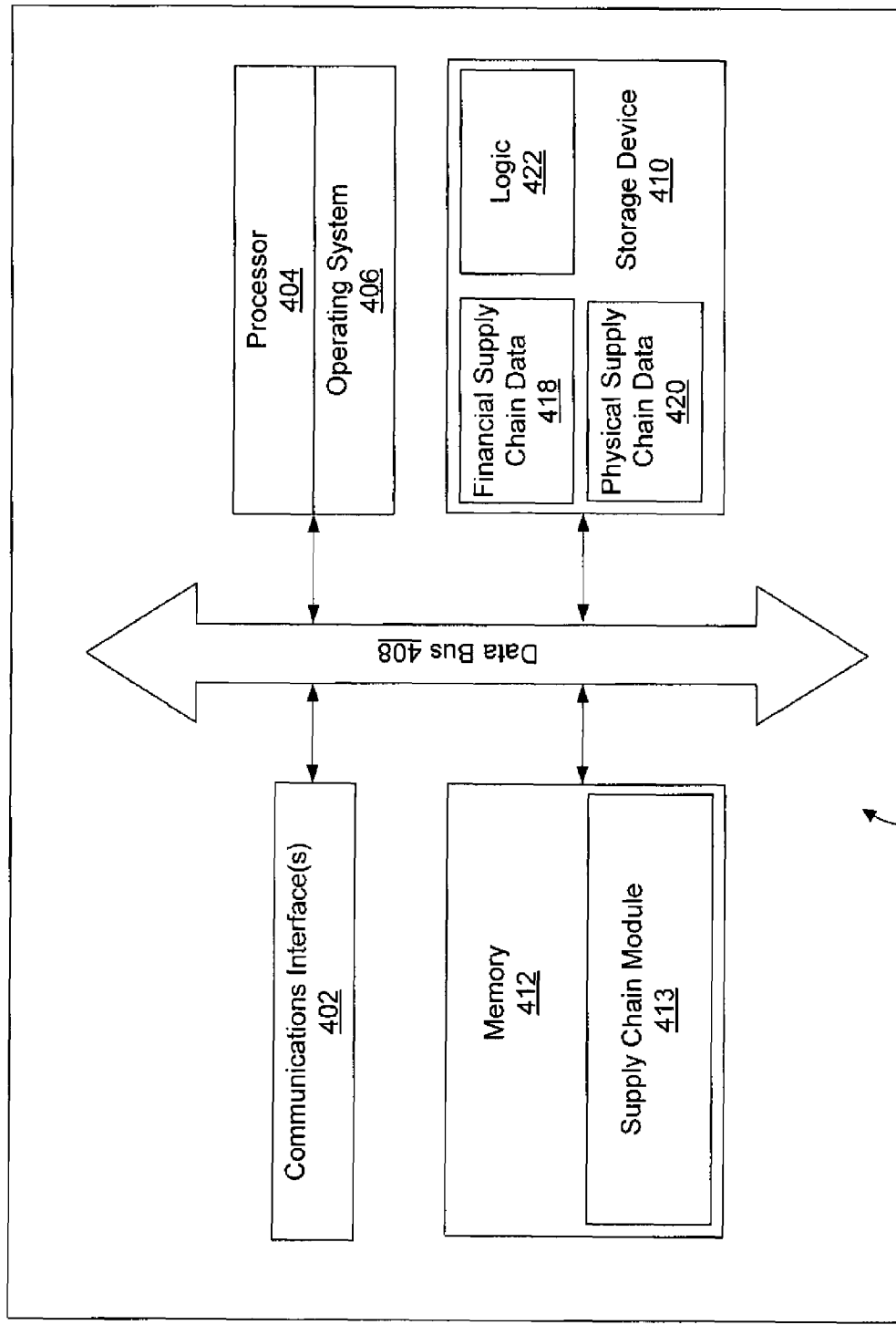

FIG. 4A illustrates an example architecture of a server, according to an example embodiment of the invention.

Figure 4B:
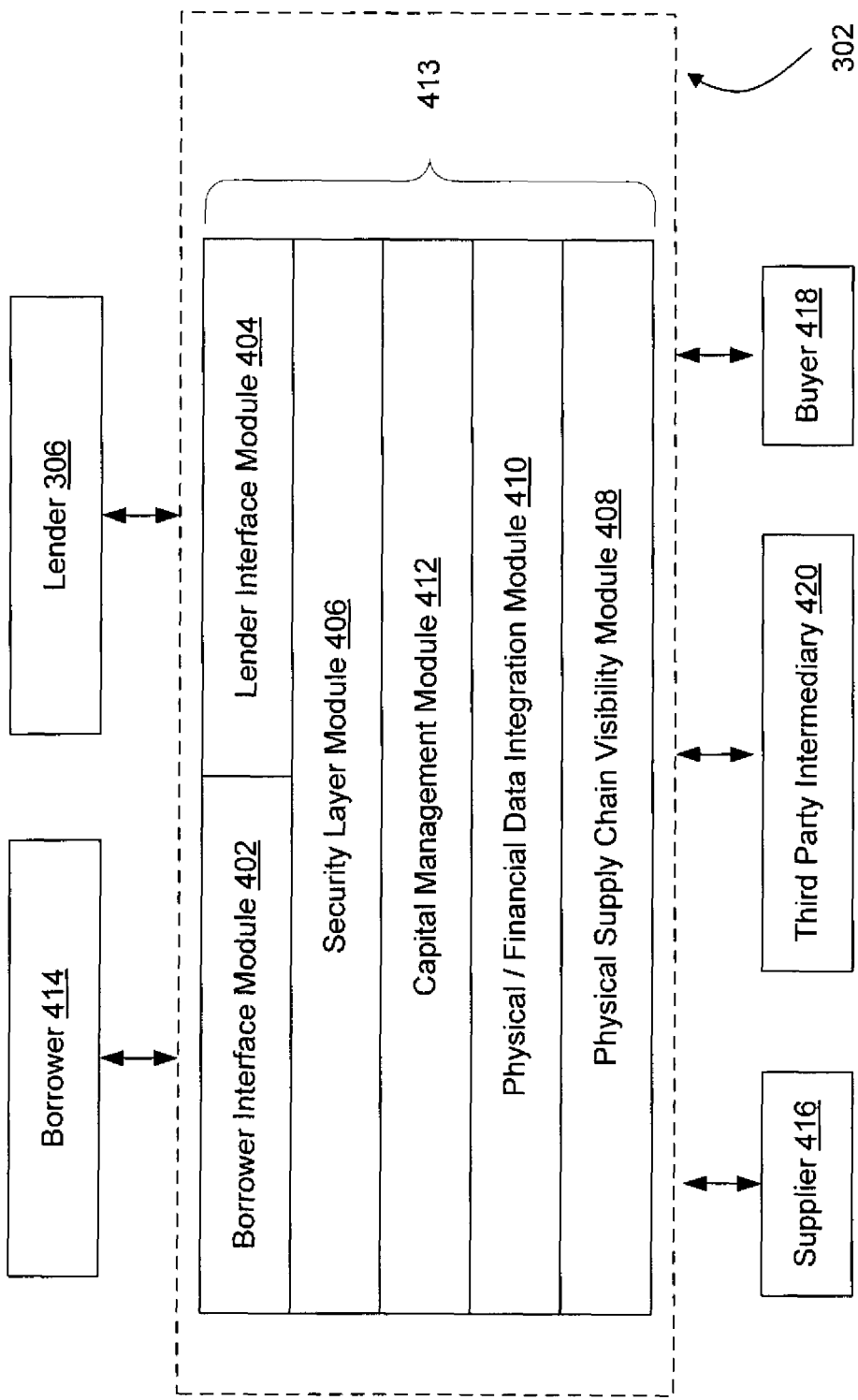

FIG. 4B illustrates a software architecture for the server of FIG. 4A, according to an example embodiment of the invention.

Figure 5A:
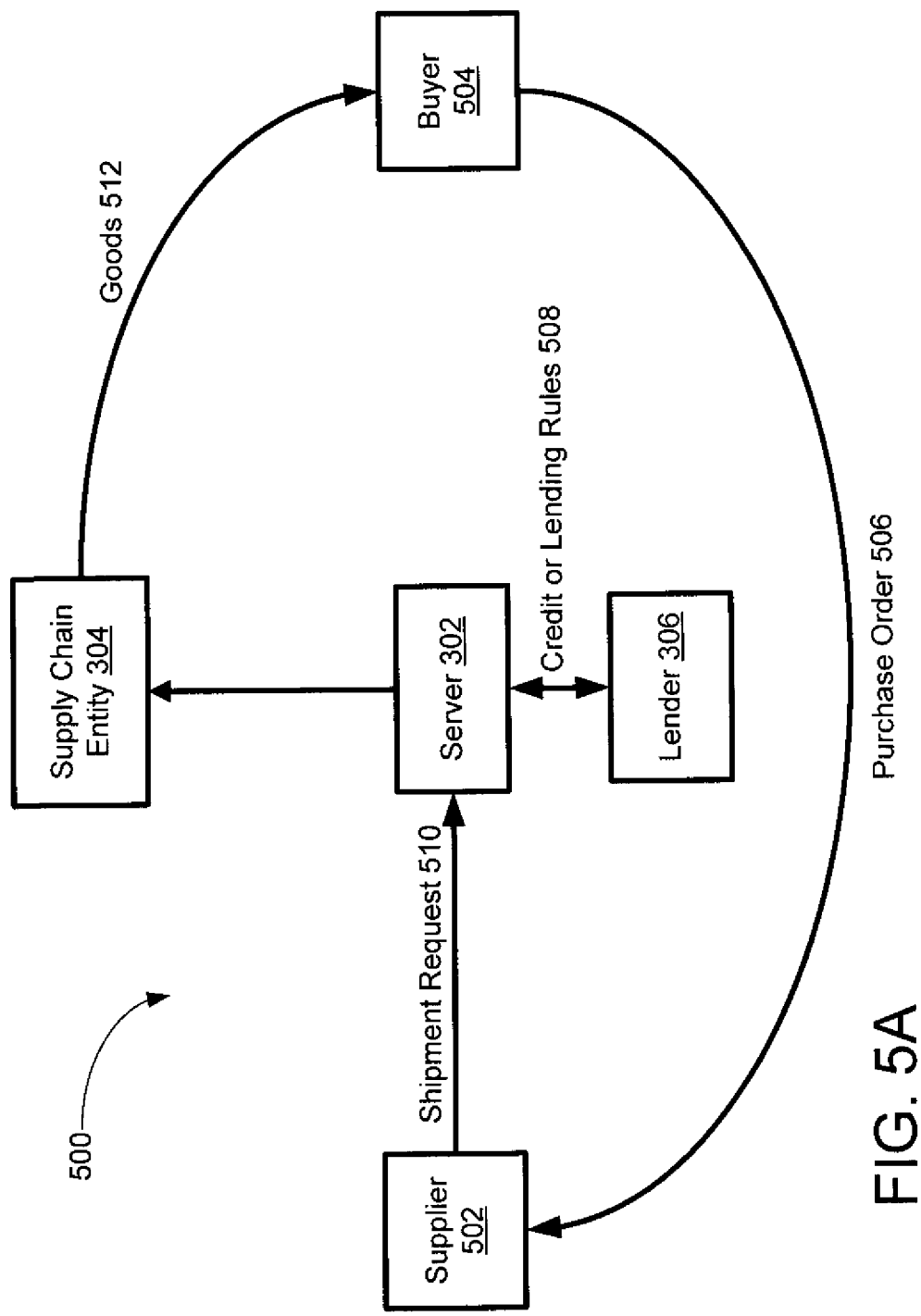
Figure 5B:
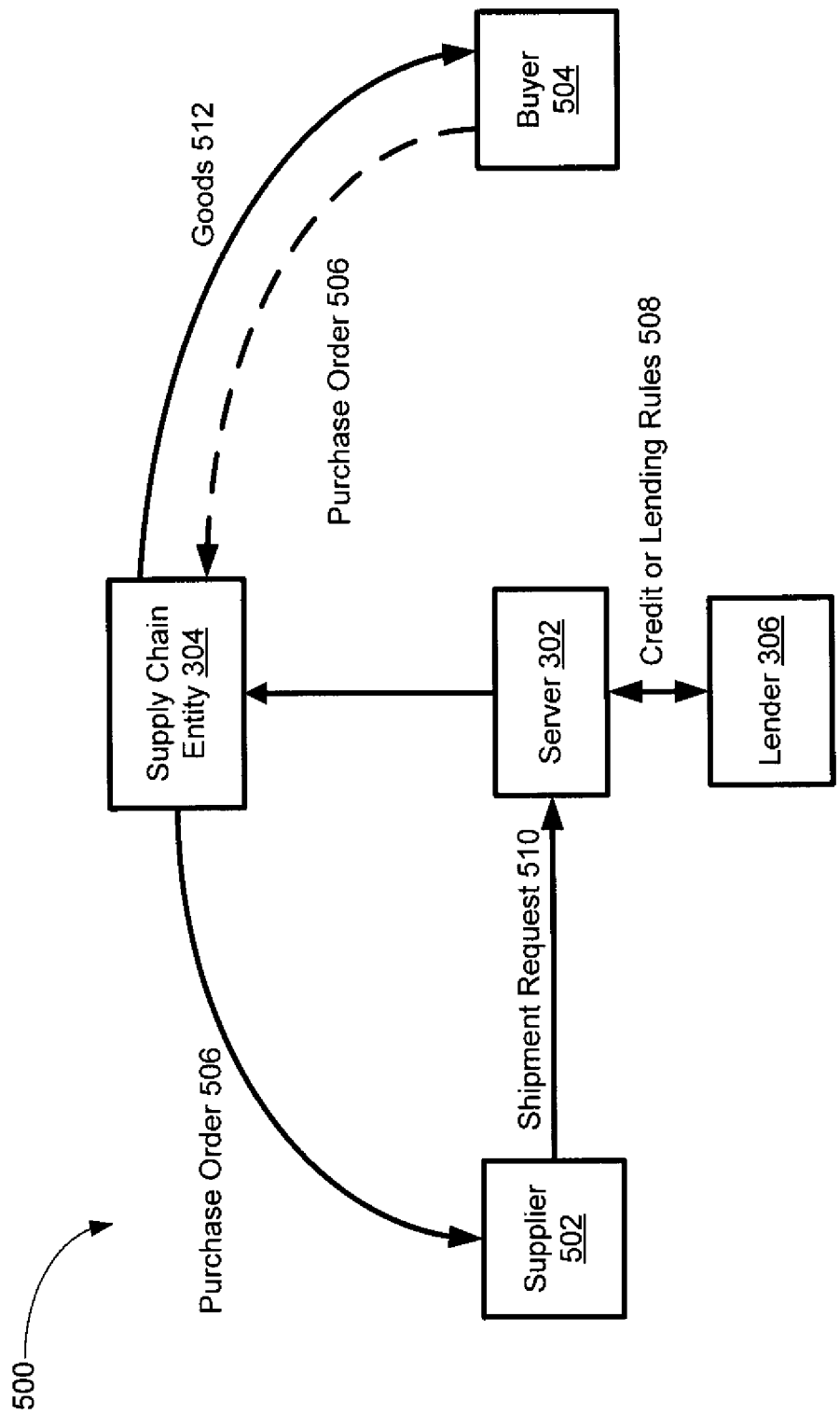
Figure 5C:
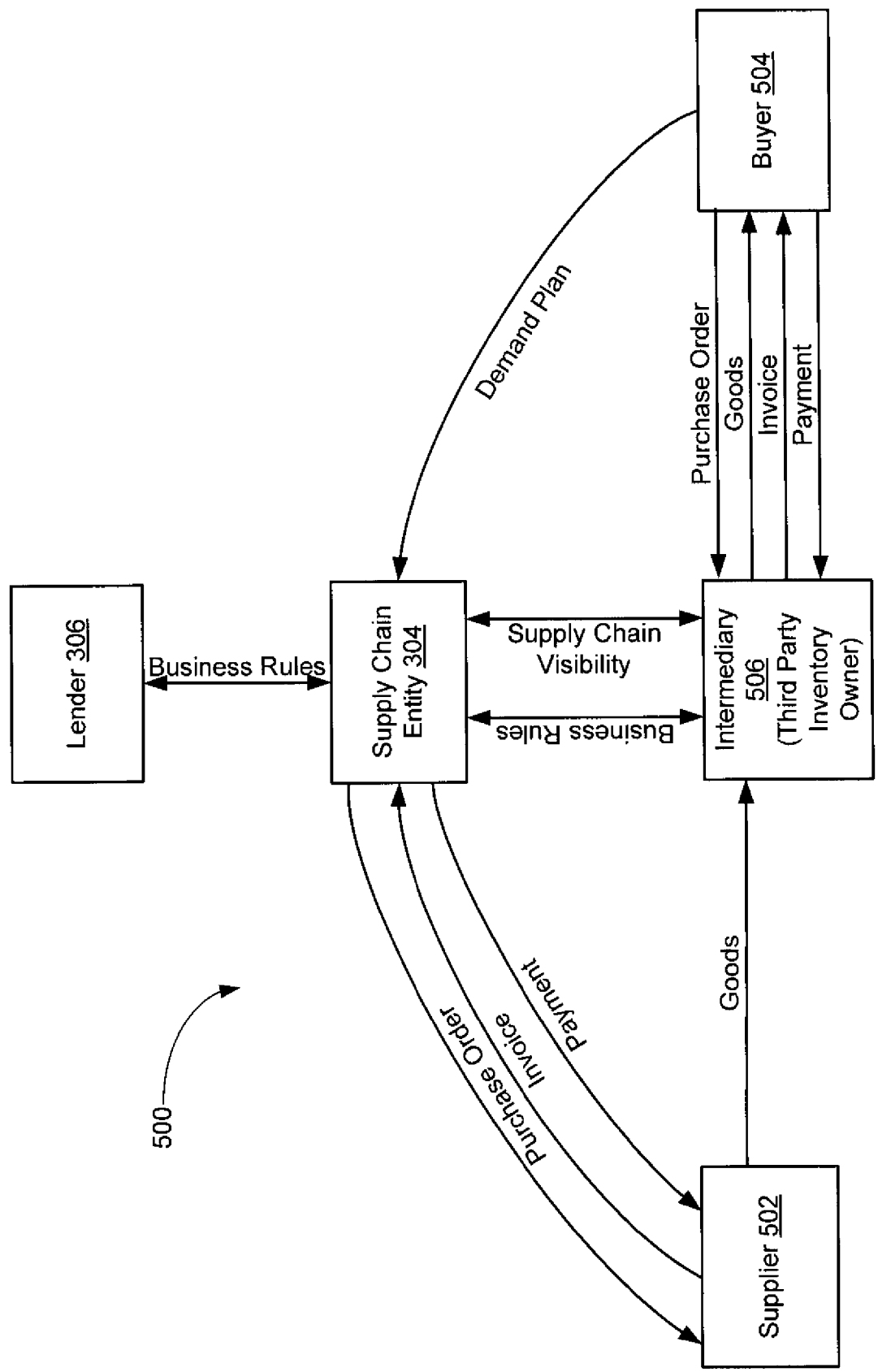

FIGS. 5A-5C illustrate control over movement of goods in a financially optimized related trade ecosystem, according to example embodiments of the invention.

Figure 6A:
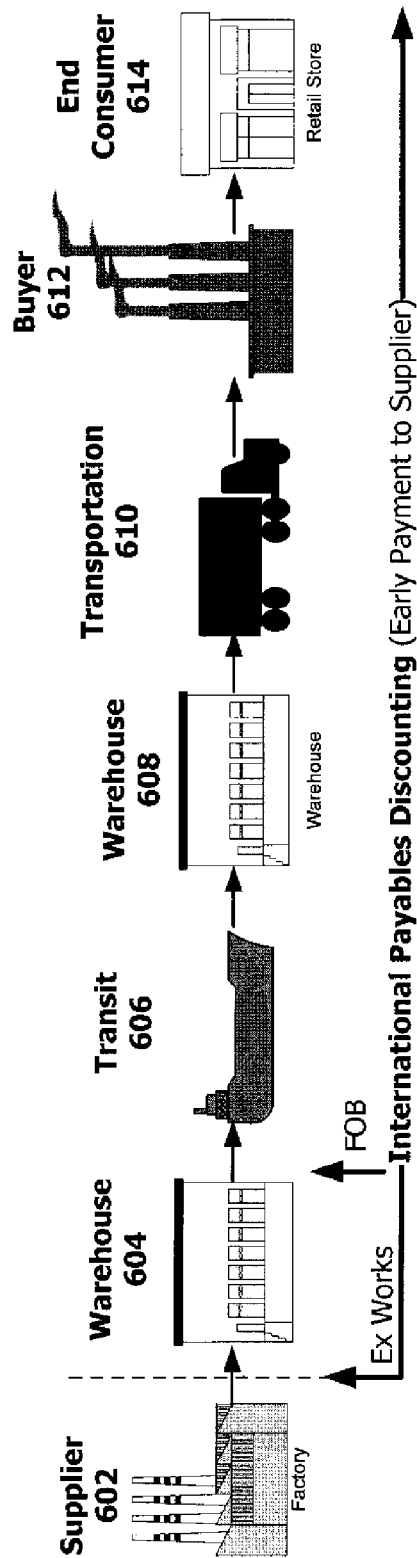

FIG. 6A illustrates an example international payables financing system, according to an example embodiment of the invention.

Figure 6B:
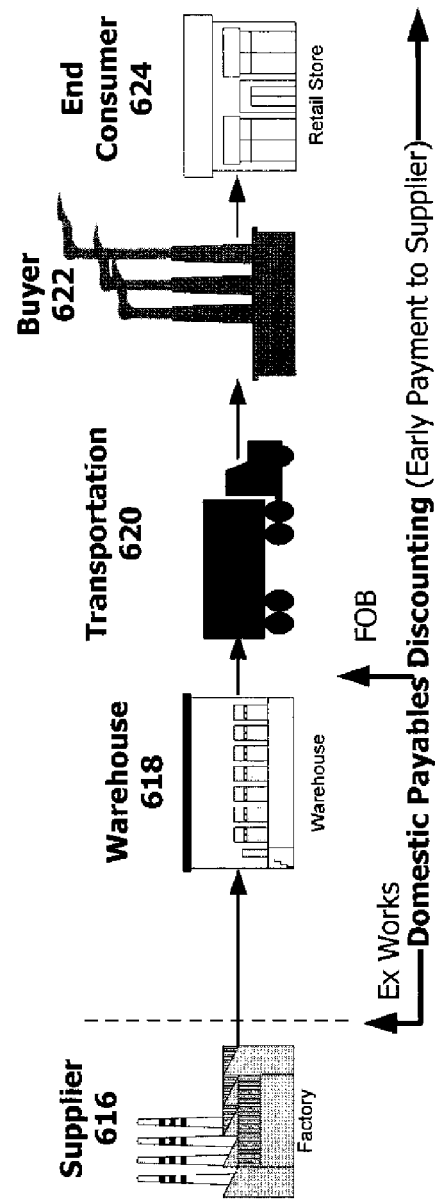

FIG. 6B illustrates an example domestic payables financing system, according to an example embodiment of the invention.

Figure 7:
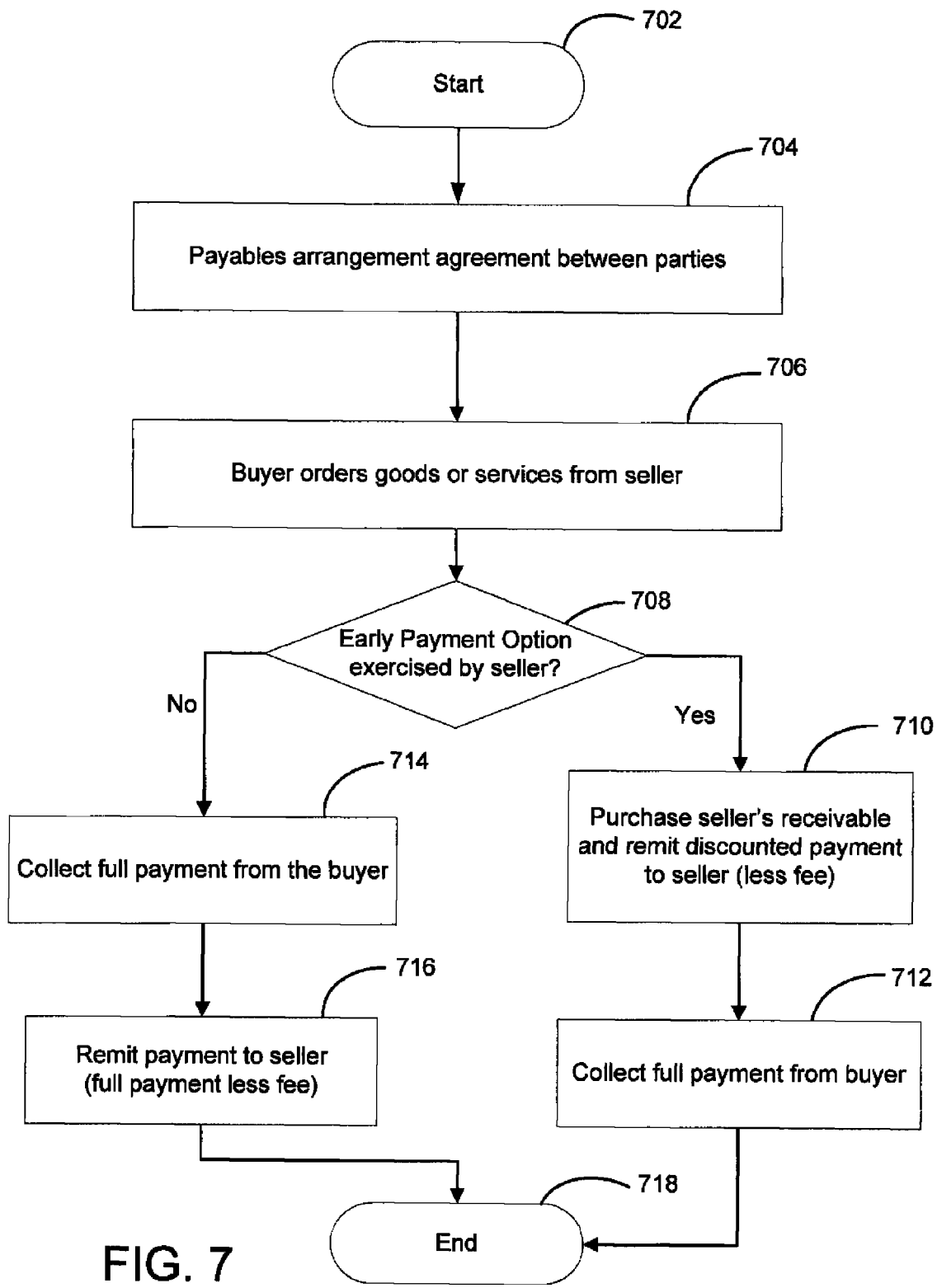

FIG. 7 illustrates the payables financing operation, according to an example embodiment of the invention.

Figure 8A:
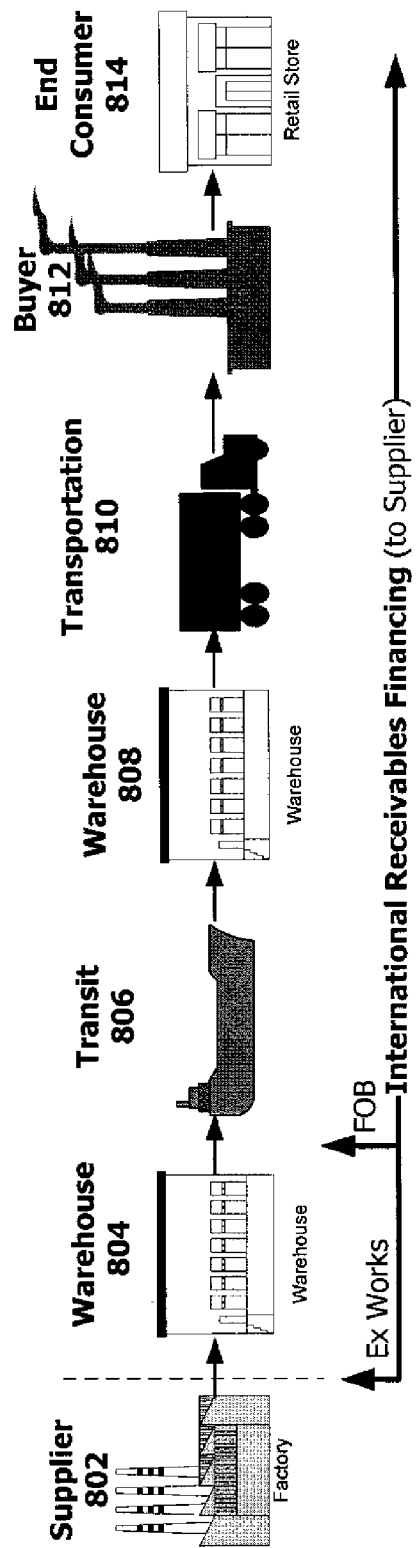

FIG. 8A illustrates an example international receivables financing system, according to an example embodiment of the invention.

Figure 8B:
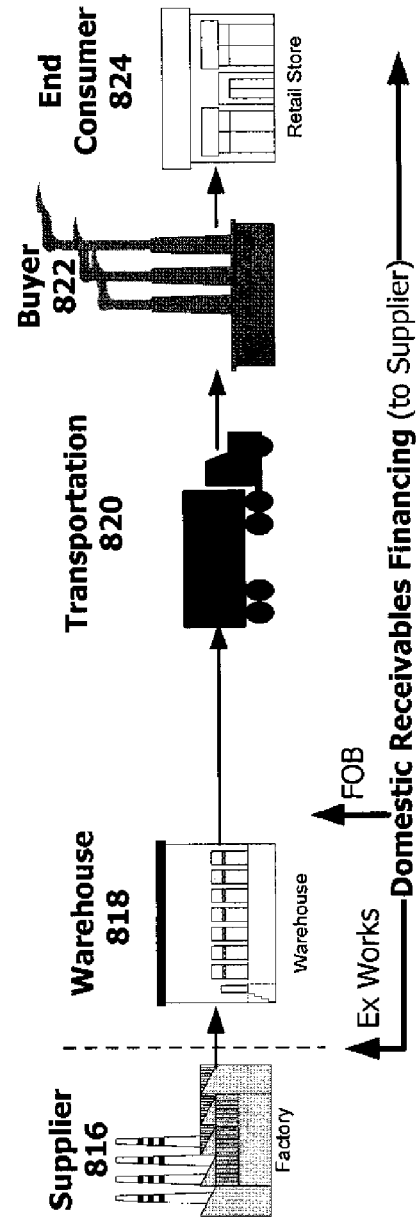

FIG. 8B illustrates an example domestic receivables financing system, according to an example embodiment of the invention.

Figure 9:
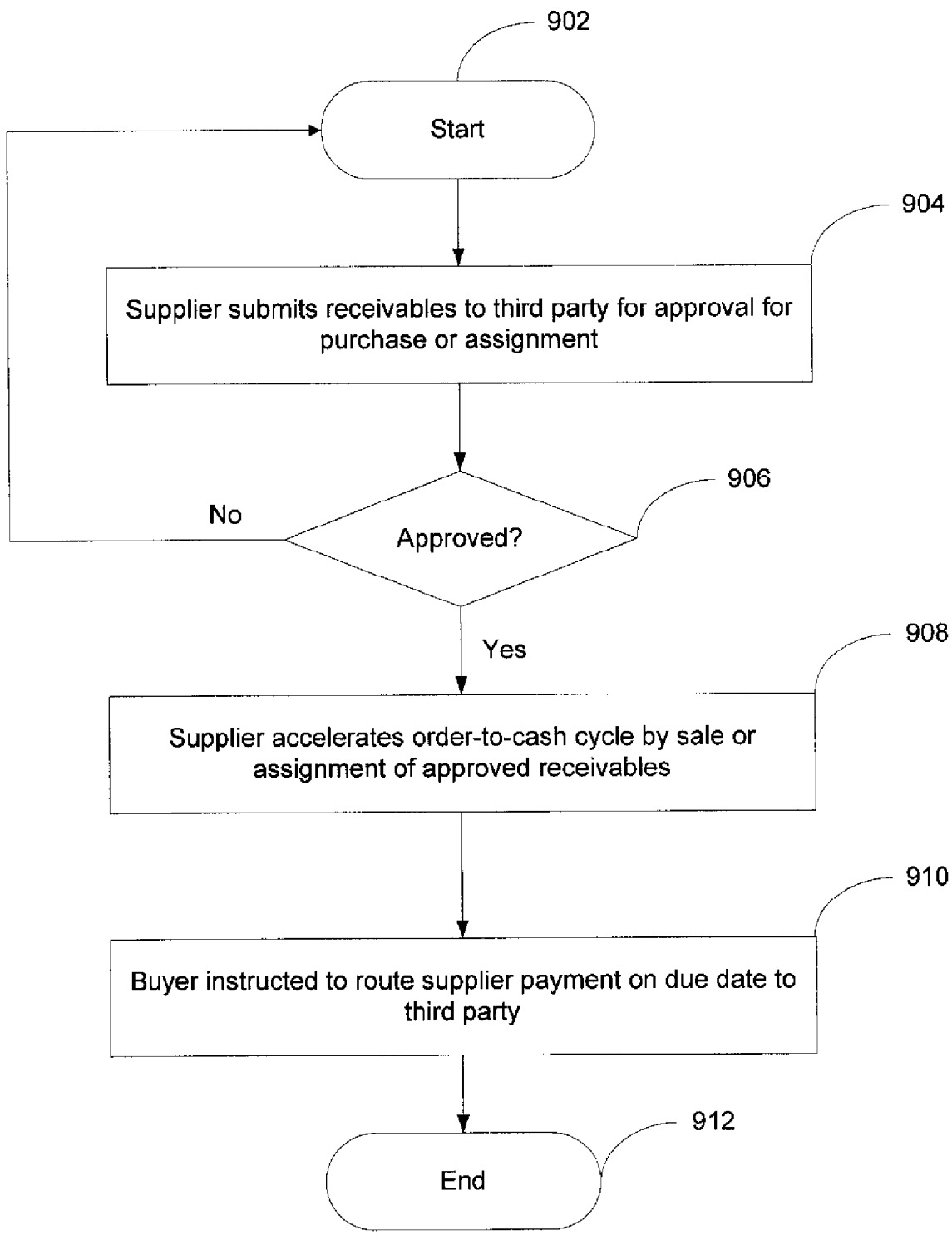

FIG. 9 illustrates an example receivables financing operation, according to an example embodiment of the invention.

Figure 10:
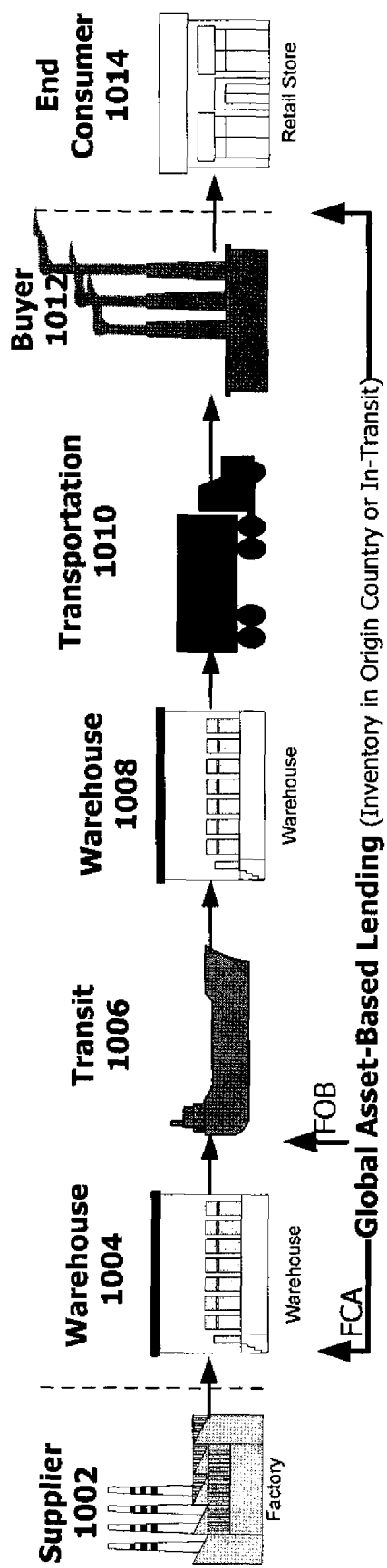

FIG. 10 illustrates an example global asset-based lending system, according to an example embodiment of the invention.

Figure 11:
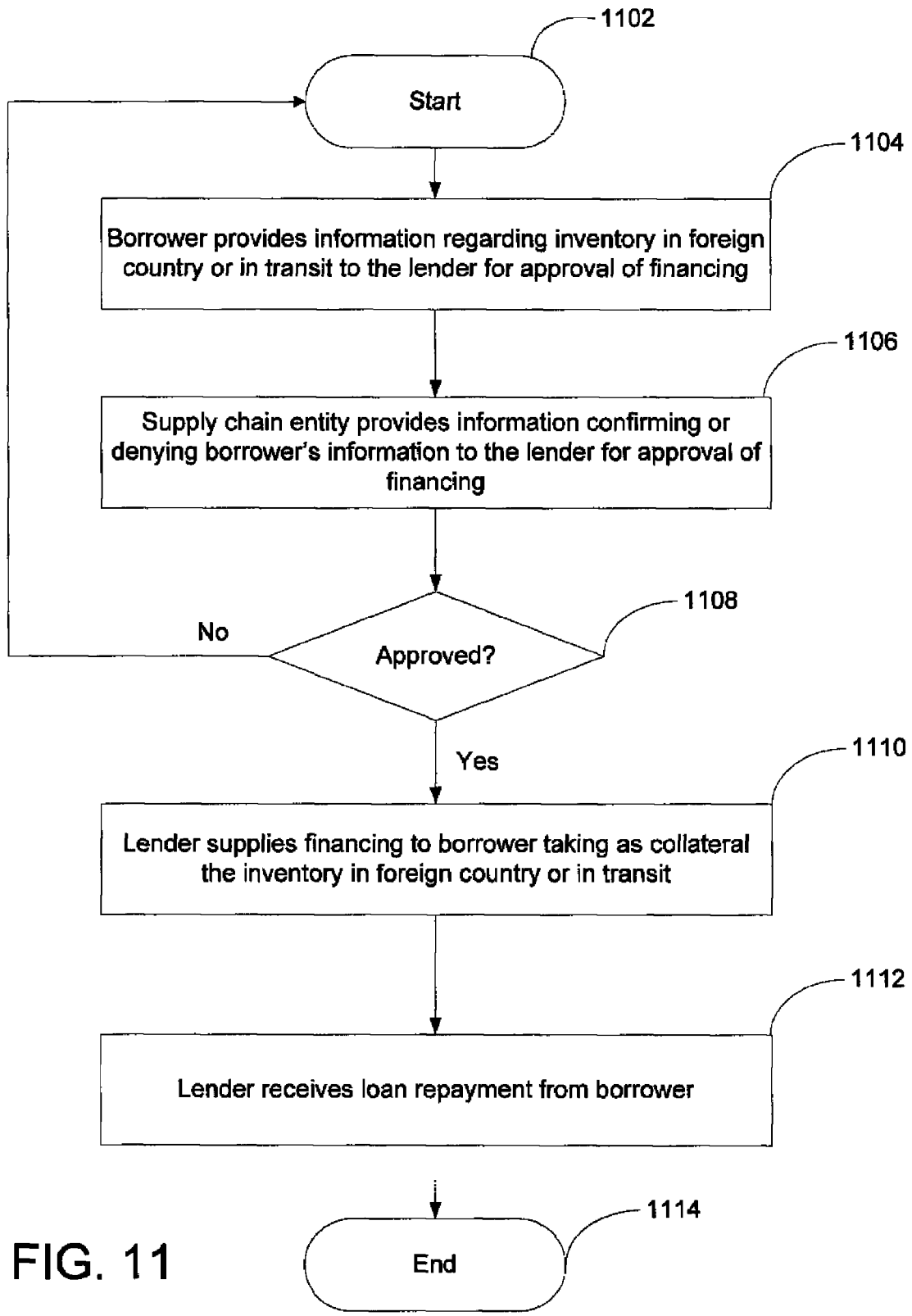

FIG. 11 illustrates an example global asset-based lending operation, according to an example embodiment of the invention.

Figure 12:
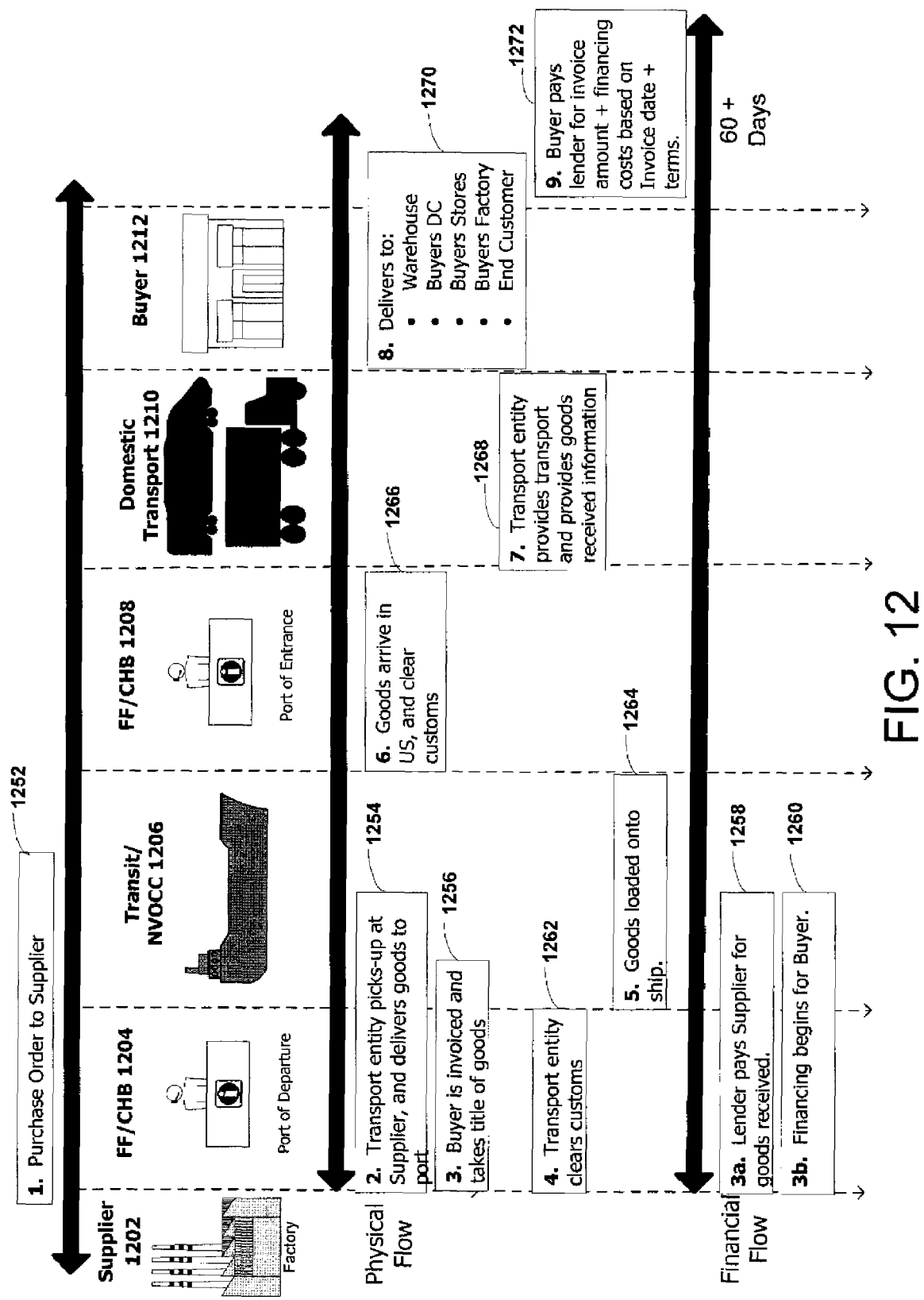

FIG. 12 illustrates an example container financing operation, according to an example embodiment of the invention.

Figure 13:
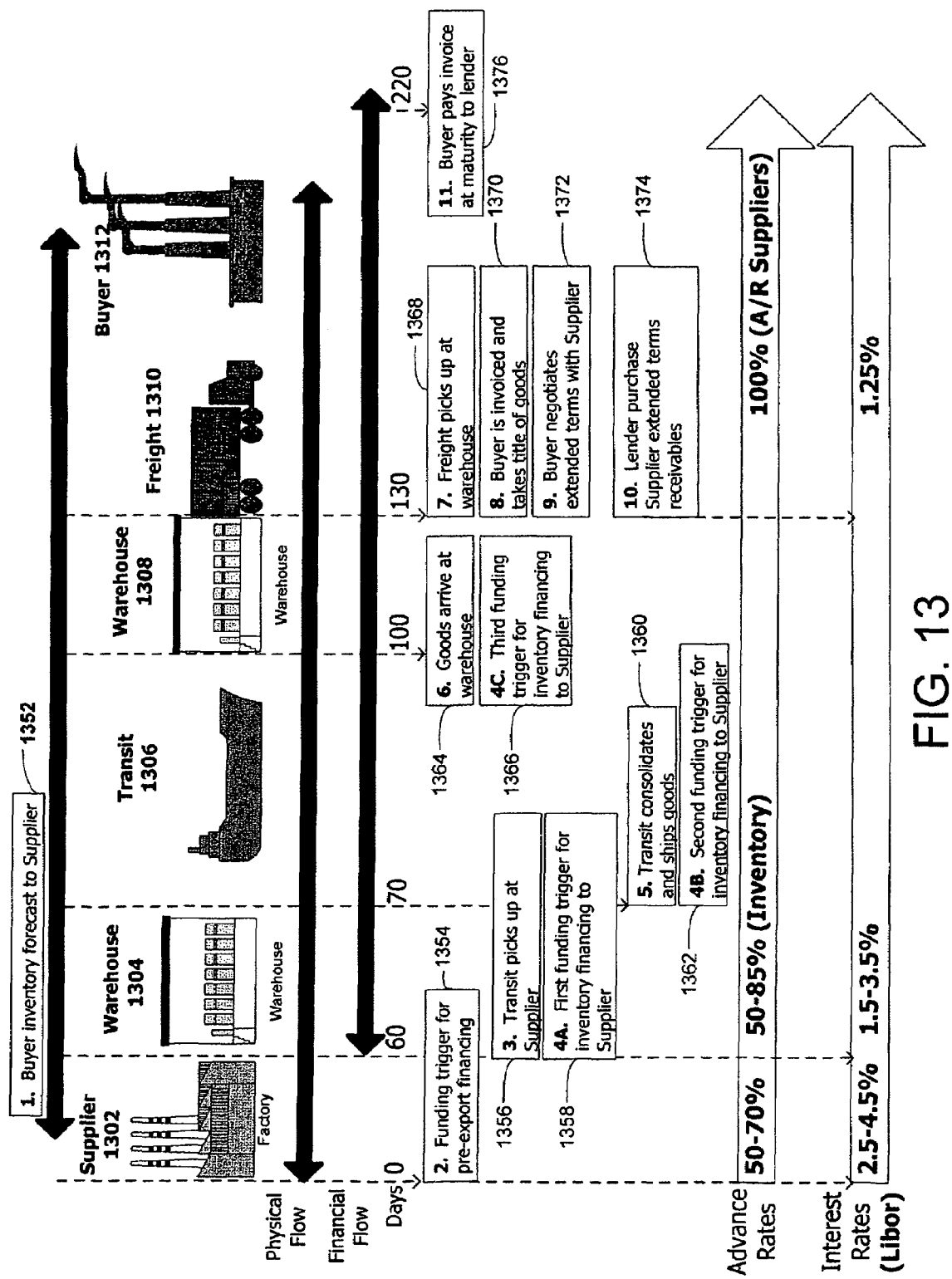

FIG. 13 illustrates an example operation of an integrated supply chain financing system, according to an example embodiment of the invention.

DETAILED DESCRIPTION OF THE INVENTION

The invention is directed to systems and methods for providing supply chain financing that include a lender providing financing to a borrower, where the financing is associated with goods provided by a supplier to a buyer under the control of a supply chain entity such as a logistics provider, freighter, or other third-party entity. The control exercised by the supply chain entity or other third-party entity may be either physical control of the goods, or control of the information and data related to the goods including data included in and related to title documents and shipping documents (e.g., certificates of origin, packing lists, bill of ladings, purchase orders, insurance certificates, warehouse receipts, commercial invoice, air way bill, etc.), or control of both the goods and the related information. The lender then evaluates attributes of a trade ecosystem of the supplier and the buyer to determine whether to finance the asset and the terms of the financing. The lender also provides the financing of the asset based upon the analyzed attributes of the trade ecosystem, where terms of the financing permit the visibility of, and control over, movement of the goods, whether before or after default of the terms of the financing. The asset may be associated with either accounts payable, an accounts receivable, or inventory, where the inventory may be in-transit, in a physical warehouse including but not limited to; a bonded logistics park, bonded logistics zone, consolidated freight station, free trade zone, customs supervised bonded warehouse, distribution center. While some embodiments of the invention below may be described with respect to only in-transit inventory, it will be appreciated that other embodiments of the invention may also apply to other inventory as well, including domestic (e.g., where the buyer resides) inventory, foreign inventory, in-transit inventory passing through one or more jurisdictions, inventory located in a physical warehouse including but not limited to; a bonded logistics park, bonded logistics zone, consolidated freight station, free trade zone, customs supervised bonded warehouse, distribution center. Example embodiments of the invention provide flexible funding opportunities through the convergence of the physical supply chain with the financial supply chain based on translating physical information to information useful to financial institutions for mitigating risk.

The invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

It will be appreciated that the invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto one or more general purpose computers, special purpose computers, or other programmable data processing apparatuses to produce a system of one or more machines (e.g., distributed architecture), such that the instructions that execute on one or more computers or other programmable data processing apparatuses create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture, including instructions that implement the function specified in the flowchart block or blocks. The computer program instructions may also be loaded onto a computer or other programmable data processing apparatus to cause a series of operational steps to be performed on the computer or other programmable data processing apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Embodiments of the invention may provide systems, methods, and computer program products for reducing underwriting or lending risks by converging physical supply chains with their corresponding financial supply chains. In general, the parties to a physical supply chain typically may include at least a supplier, a buyer, and a transport (or logistics) entity. Likewise, the parties to a financial supply chain may include at least a lender and a borrower. Where the physical supply chain converges with the financial supply chain, the borrower in the financial supply chain may be either or both the supplier and buyer in the physical supply chain. The transport entity may also be a borrower or a lender in the financial supply chain according to another embodiment of the invention. The lender may be a financial institution lender, a non-financial institution lender, a private-party lender such as a hedge fund or mutual fund, a venture capitalist, and the like. Additionally, the lender may be a financing arm (e.g., a subsidiary, affiliate or joint venture) of a supply chain company, a supplier, a buyer, transport, and the like. Indeed, the lender may be any entity willing to provide financing to the borrower.

When converging the physical supply chain with the financial supply chain in accordance with an embodiment of the invention (e.g., the convergence of goods, funds, and information), lenders can determine lending or underwriting risks by evaluating the trade "ecosystem(s)" of which the borrower (e.g., buyer, supplier, etc.) is a member. As will be described in further detail below, an ecosystem may be evaluated based upon analyzing aspects of one or more of the supplier, the buyer, the relationship between the supplier and the buyer, the goods provided from the supplier and the buyer, the control of the goods by a third party (e.g., a supply chain company, transport, and/or logistics entity, etc.), and/or the "visibility" of the goods based on information from the supplier to the buyer or the transport entity. Visibility is the capability to electronically display the physical location of goods within the supply chain. Visibility may include information related to the control and/or movement of goods (or the documents associated with those goods) including milestone stages of the transport of goods (e.g., placed on transport, arrives in port, etc.), data used to create documentary evidence of goods (e.g., negotiable bill of lading, etc.), detailed valuation of the goods at an SKU level, the velocity of the movement of goods, and the occurrence of exception events (e.g., delay in the delivery of the goods at any stage; catastrophic loss of the goods; re-forecasting of a particular supply chain events expected occurrence; false-positive event detection where an event may have been previously been inaccurately categorized as having/having not occurred; missing or lost data, documentation, or the goods themselves, etc.) For example, if a ship delivering goods is delayed due to weather or re-routed to another port, such information may be captured and analyzed as to how that will affect the rest of the delivery events and how such delay make affect the terms of financing associated with the goods (e.g., if the delay affected the risk level associated with the delivery of the goods then the terms of financing may need to be adjusted accordingly). Another example may be where a boat delivering goods has cleared customs several days before docking but is delayed by weather or re-routed to another port. In that scenario there is a disconnect between what the custom documentation may say about the delivery status and what the actual delivery status, this may trigger an exception event, which then may be determine through rules implemented by software, which information is more accurate and should be either relayed to the lender or used to automatically change the terms of financing. A more detailed discussion of the implementation of an example embodiment of the invention is discussed in further detail with reference to FIGS. 4A-5B below. Other aspects of the ecosystem can also be analyzed without departing from embodiments of the invention.

Therefore, by examining the ecosystem of the borrower, the lender can determine one or more of the following: (i) whether to provide financing to a borrower, (ii) when to provide financing to the borrower, (iii) in what amounts to provide financing to the borrower, (iv) whether to continue providing financing to the borrower, (v) the extent to which financing (e.g., the amount, advance rate, size of the discount, interest rate, etc.) should be made available to the borrower, (vi) what assets of the borrower to finance, (vii) the terms and conditions of the financing, (viii) whether and how to intrude into the physical supply chain (e.g., authorize shipment release, intercept the movement of any goods or documents subject to financing, determine the velocity of assets moving through the supply chain, determine who is controlling the assets at various stages in the supply chain, authorize relocation of the goods from one location to another, authorize holding or segregating or repossessing goods, etc.), and (ix) how and when to create the legal documents relating to the transport of goods (e.g., title documents, etc.) from the data relating to the visibility of the goods that is collected and stored in one or more databases and when to deliver such information to the lender.

Accordingly, by examining ecosystems associated with the borrowers, the lenders can provide financing to borrowers at one or more opportunities along the entire supply chain, thereby creating a financially optimized related trade ecosystem (or "F.O.R.T.E"). Example financing opportunities may be associated with pre-shipment goods/inventory financing; post-shipment goods/inventory financing, including in-transit inventory; accounts receivable financing; accounts payable financing; inventory ownership; or combinations thereof. Additionally, the ecosystem information provided by transport, logistic and/or intermediary entities in the supply chain may allow for new financial services such as real-time collateral auditing services, container financing, physical letters of credit, etc. The details of these and other financing opportunities and services will be discussed below with reference to the accompanying figures. In accordance with an embodiment of the invention, borrowers that are a part of a trade ecosystem as either suppliers or buyers are provided with opportunities to monetize or otherwise obtain financing on goods/inventory within a physical supply chain, or the related accounts payable/accounts receivable as products move from pre-production stages at the supplier to final delivery stages at the buyer.

As described above, lenders may evaluate the underwriting risks of borrowers based upon the trade ecosystem to which the borrower belongs. As illustratively described below with respect to FIGS. 1A-1C and 2, an ecosystem may cover a single physical supply chain or multiple supply chains without departing from embodiments of the invention.

FIG. 1A illustrates an example ecosystem 20 in accordance with an embodiment of the invention that includes a physical supply chain with a supplier 102, transport 104, and a buyer 106. During operation of the ecosystem 20, the buyer 106 may place a purchase order with the supplier 102. The supplier 102 manufactures or assembles the goods according to the purchase order. Transport 104 moves the goods along the supply chain from the supplier's 102 location to the buyer's 106 location. While not shown in FIG. 1A, transport 104 may include one or more ground, air, water, or multi-modal transport means such as trucks, railways, airplanes, intermodal carriers, fresh-water vessel carriers, or ocean-vessel carriers. Transport 104 may further include one or more intermediate warehouses along the supply chain, or one or more bonded logistics parks or free trade zones, as well as one or more import/export customs, if for example, the supplier 102 and the buyer 106 are located in different countries. A more detailed supply chain is described with reference to FIG. 3 below.

FIG. 1B illustrates another example ecosystem 40 in accordance with an embodiment of the invention. In the ecosystem 40, there may be one or more suppliers 108 as well as one or more buyers 112. Therefore, a buyer 112 may receive goods from multiple suppliers 108, and a supplier 108 can also provide goods to multiple buyers 112. Likewise, multiple suppliers 108, perhaps related suppliers 108 in a particular industry segment, can provide goods to multiple buyers 112. While not illustrated in FIG. 1B, transport 110 may include one or more ground, air, water or multi-modal transport means such as trucks, railways, airplanes, intermodal carriers, fresh-water vessel carriers, or ocean-vessel carriers. Transport 110 may further include one or more intermediate warehouses (including bonded warehouses or bonded logistics parks) along the supply chain as well as interact with one or more intermediary entities such as import/export customs, if for example, the supplier 108 and the buyer 112 are located in different countries. Third party intermediaries may be any of a variety of information sources such as a logistics provider, software provider, government agency or similar entity working in combination with the transporting entity to provide data, in the form of electronic documents or otherwise, relating to the in-transit inventory's condition, location, status and any other information that may be useful to the lender, seller or buyer.

FIG. 1C illustrates yet another example ecosystem 60 in accordance with an embodiment of the invention. The ecosystem 60 provides illustrative combinations of aspects of the ecosystem 20 of FIG. 1A and the ecosystem 40 of FIG. 1B. In the example ecosystem 60, there may be one or more suppliers/buyers 114. Each supplier/buyer 114 may perform dual roles—that is, both a supplier role and a buyer role. First, the supplier/buyer 114 may purchase goods from one or more other suppliers (not shown). Second, each supplier/buyer 114 can also provide goods to a buyer/supplier 118 via transport 116 or other transport means. Likewise, the buyer/supplier 118 may receive goods from other suppliers (not shown). The buyer/supplier 118 can also provide goods to one or more suppliers/buyers 122 via transport 120 or other transport means. Similarly, each supplier/buyer 122 may provide goods to the buyer/supplier 126 via transport 124 or other transport means. Variations of the trade ecosystems are available without departing from the embodiments of the invention. Indeed, other trade ecosystems may include a web of two or more related sub-ecosystems that each include one or more suppliers and buyers, as illustrated in FIG. 2 and may include multiple transport, logistic, and/or intermediary entities. Accordingly, lenders may examine all or a portion of the related sub-ecosystems when determining the lending or underwriting risks of a borrower that is a member of one of the sub-ecosystems. Additionally, lenders may also examine the relationship of one ecosystem (comprised of one or more sub-ecosystems) to another ecosystem (comprised of one or more sub-ecosystems) when determining the lending or underwriting risks of a borrower that is a member of one of the ecosystems. This nested approach may provide optimization of not only the financing arrangements for borrowers within one ecosystem but also between or among ecosystems and subecosystems.

In the ecosystems 20, 40, and/or 60 of FIGS. 1A-1C, either the supplier (e.g., supplier(s) 102, 108, 114, 118, 122, 126) or the buyer (e.g., buyer(s) 106, 112, 114, 118, 122, 126), or both, may need financing from a lender. In other words, the supplier and/or the buyer may be the potential borrower. According to an embodiment of the invention, the lender may examine the ecosystem (e.g., ecosystem 20, 40, or 60 of FIGS. 1A-1C) of the borrower to obtain associated underwriting information. As introduced above, the underwriting information obtained from the ecosystem may be related to one or more of the following ecosystem attributes or information related to: (i) the supplier (e.g., credit rating, legal jurisdiction, business structure, etc.); (ii) the buyer (e.g., credit rating, legal jurisdiction, business structure, etc.); (iii) the relationship between the supplier and the buyer (e.g., the length of the trading relationship between the supplier and the buyer, the volume and velocity of trade between them, etc.); (iv) the type of goods provided from the supplier and the buyer (e.g., commodity, special purpose goods, etc.); (v) the visibility of data relating to title and possession (e.g., tracking, information gathering, document generation, monitoring and/or exception handling, etc.) of the transport of the goods from production at the supplier to delivery at the buyer and the timing associated therewith; and/or (vi) the duration (tenor)

of the borrowing as it relates to the velocity at which the goods (collateral) move through the supply chain. One or more of the above-identified underwriting information may be evaluated for both suppliers and buyers who seek financing from lenders. While the underwriting information will be discussed below with respect to the ecosystem 20 of FIG. 1A for illustrative purposes, the following discussion is equally applicable to other ecosystems as well, including ecosystem 40 of FIG. 1B and ecosystem 60 of FIG. 1C as well as the ecosystem(s) of FIGS. 2 and 3.

First, with reference to FIG. 1A, the underwriting information may be related to the supplier 102. Examples of such underwriting information may include financial information and non-financial information associated with the supplier 102. The financial information may be in a variety of forms, including one or more of the supplier's 102 credit worthiness (e.g., credit scores), revenues, profit margins, existing debts, and market share of the supplier 102. Other financial information may be obtained from the supplier's 102 accounting information, which may include the supplier's 102 balance sheets, income statements, cash flow statements, and annual reports. Generally, positive financial information is indicative of a strong supplier 102 and is typically favored by a lender for underwriting purposes. Non-financial information may include the supplier's 102 maturity (e.g., number of years in business), and the legal jurisdiction the supplier 102 is subject to. The legal jurisdiction may be necessary for the lender to determine the types and strengths of security interests available, and perfections thereof, as well as creditor rights under any bankruptcy laws. Yet other non-financial information may be associated with timeliness of shipments of goods.

Second, the underwriting information may be related to the buyer 106. Examples of such underwriting information may include financial information or non-financial information related to the buyer 106. The financial information may come in a variety of forms, including one or more of the buyer's 106 credit worthiness, revenues, profit margins, existing debts, and market share of the buyer 106. Other financial information may be obtained from the buyer's 106 accounting information, which may include the buyer's 106 balance sheets, income statements, cash flow statements, and annual reports. Yet other financial information may include payment history between the buyer and the supplier. Generally, positive financial information is indicative of a strong buyer 106 and is typically favored by a lender for underwriting purposes. Non-financial information may include the buyer's 106 maturity (e.g., number of years in business), and the legal jurisdiction the buyer 106 is subject to if the buyer 106 is the borrower. The legal jurisdiction may be necessary for the lender to determine the types and strengths of security interests available, and perfections thereof, as well as creditor rights under any bankruptcy laws.

Third, the underwriting information may be directed to the relationship between the supplier 102 and the buyer 106. As an example, the lender may review information regarding the duration of the relationship between the supplier 102 and the buyer 106 since a longer relationship is favored for underwriting purposes. Likewise, the lender may review the history of disputes between the supplier 102 and the buyer 106, since fewer disputes may be favored for underwriting purposes. The lender may also review the supplier's and/or buyer's relationship with other businesses outside the particular ecosystem being reviewed to obtain an inference or prediction as to the behavior of either party in the ecosystem being reviewed. Moreover, the lender may review the relative strengths of the supplier 102 and the buyer 106. For example, where the supplier 102 is the borrower, the lender may look to the financial strength of the supplier 102 compared to the buyer 106. If the buyer 106 is financially stronger than the supplier 102, then the underwriting risk may be reduced since the buyer 106 may be more likely to remit payment to the supplier 102 in a timely manner.

Fourth, the underwriting information may be related to the goods provided from the supplier 102 and the buyer 106. As an example, the lender may examine the velocity of the supply chain (or volume of goods) between the supplier and the buyer. The velocity may be determined based upon the rate at which goods are reordered by the buyer and/or the speed at which the goods move through the supply chain. Typically, a high-velocity supply chain (or high volume of goods) is usually indicative of high demand for the goods provided by the supply chain, and thus, the underwriting risk may likewise be reduced. As another example, the lender may evaluate the importance of the goods provided by the supplier to the buyer. For instance, an essential or very important component provided by a supplier 102 for a final product manufactured by the buyer 106 may minimize the underwriting risk of lending to the supplier 102. This minimizes risk because the buyer 106 will most likely remit payment to the supplier 102 since the components are needed to finish the buyer's 106 product.

Fifth, the underwriting information may be related to the "visibility" of the goods from production at the supplier to delivery at the buyer. In other words, the supplier 102 or buyer 106 may use information provided by a company controlling and/or monitoring the transport 104 (such as a supply chain entity, which may include a logistics provider) to monitor inventory levels, and to determine when to place additional orders from a particular supplier, as well as other operational decisions. The information provided by the supply chain entity may be utilized by one or more of the supplier 102, buyer 106 and/or a lender financing either or both the supplier 102 and buyer 106 when making various operational and financial decisions. It is this "visibility" of the goods that mitigates risks associated with the supply chain, such as dealing with unknown suppliers or unknown buyers, unsecured transportation methods, custom issues, obsolescence of the goods, and the like.

The lender may reduce underwriting risk by having visibility into the supply chain, and in particular, visibility as to the quantity, type (e.g., SKU), conformance, location, and timing of those goods that are the subject of financing (e.g., the collateral). For example, the lender may receive prompt electronic updates as to conformance and location of particular goods along the supply chain. Moreover, the lender may receive electronic and/or physical documents associated with movement of the goods including advance ship notices (ASNs), invoices, purchase orders, packing lists, insurance certifications, bills of lading (whether negotiable or non-negotiable), warehouse receipts, inventory valuation reports and proof of delivery documents. Additionally, according to an embodiment of the invention, this visibility into the supply chain may allow the lender to decide which assets to finance, how much to finance against the asset based on milestone events, and at which point to provide financing to the borrower. In some example embodiments of the invention, the visibility of the supply chain may allow for real-time adjustments to financing arrangements and/or more complex arrangements where the financing changes depending on the completion of particular events occurring in the supply chain. For example, when it has been detected that the in-transit inventory is placed on a ship for transport, the advance rate may automatically change to reflect the decrease in the risk that the inventory may not actually be delivered.

Further, the visibility into the supply chain permits the lender to take action to perfect its claim to a secured asset and repossess the asset in the event of a default by the borrower. In making the determination of when a party has violated the covenants contained in a financing agreement, the supply chain entity may serve as a real-time auditor determining that what the borrower has performed or provided regarding the in-transit inventory (e.g., amount, condition, velocity of delivery, number of shipments, etc.) is the same as what the borrower warranted or informed the lender when arranging financing.

The data elements gathered in the supply chain execution (rather than the documents created from those data elements) could be used as supporting information to enable a lender to make lending-related decisions and extend credit earlier to either a buyer or a seller. One of the many examples could be the enhancement of the required documentation for letters of credit. International and domestic sellers need assurance that buyers will pay for the goods sold in a timely manner. A Letter of Credit provides the seller with such an assurance. The Letter of Credit is beneficial to all parties in that the seller receives payment, the buyer's cash flow is improved, the lending institution obtains fees for issuing the letters of credit plus interest after the letter of credit is exercised, and an advising entity gets fees for its services of acting as an intermediary between the issuing bank and the seller. According to an example embodiment of the invention, the data used to create current letter of credit documents (e.g., purchase order, packing list, country of origin, compliance requirements, etc.) could be gathered and verified creating an automated way to perform the functions currently being performed by an "advising bank." The benefits include eliminating errors currently resulting from manual data capturing processes, reduction of costs in capturing that data, and having the ability to reconcile discrepancies earlier in the process before the audit trail becomes stale. The supply chain entity is in a position of control over the in-transit inventory of a seller and is, therefore, able to extract data relating to the in-transit inventory relevant to assessing the financial arrangements that may be devised by the seller, buyer and financial institutions. It is this position that allows the supply chain entity to cause an advising bank's role in establishing letters of credit to be essentially redundant. Therefore, the supply chain entity may use that information to act as an advising entity (e.g. advisory bank) for the purposes of issuing Letters of Credit. In some alternative embodiments of the invention, the supply chain entity may fulfill both roles of advisor and lender when issuing Letters of Credit, or "physical" letters of credit. Physical letters of credit are derived from the data obtained by the supply chain entity in its monitoring of the supply chain visibility data. Use of physical letter of credit may eliminate the need for traditional letters of credit, relying solely on the supply chain visibility data monitored by the supply chain entity to provide the necessary risk mitigation. In one embodiment of the invention the data the supply chain entity is able to obtain and/or monitor the in-transit inventory, which allows for enough information for the lender to providing financing.

Accordingly, as described above, the lender can make lending or underwriting decisions based upon information obtained from the ecosystem, including underwriting attributes or information related to one or more of: (i) the supplier, (ii) the buyer, (iii) the relationship between the supplier and the buyer, (iv) the goods provided from the supplier and the buyer, and/or (v) the visibility of the goods from production at the supplier to delivery at the buyer. Other embodiments of the invention may utilize variations of the underwriting attributes and information described above.

According to another embodiment of the invention, the lender may summarize the ecosystem attributes and information into one or more ecosystem scores, which may be similar to credit scores. For example, the financial strengths of the buyer and seller (e.g., credit rating) may comprise a first percentage (e.g., 25%) of the ecosystem score. For example, the credit score of the buyer and/or the seller may be a factor considered when determining the financial strengths of the buyer and seller. The strength of the relationship between the supplier and buyer may comprise a second percentage (e.g., 20%) of the ecosystem score. The velocity of the goods may comprise a third percentage of the ecosystem score (e.g., 15%). The type of perfection available on the goods (e.g., the type and priority of lien available in the jurisdiction where the inventory is located and the ease of enforcing the lien and repossessing the inventory) may comprise a fourth percentage of the ecosystem score (e.g., 18%). Finally, the extent of visibility of the goods (e.g., based upon the frequency and types of updates along the physical supply chain), which may include a variety of electronic updates (e.g., e-mail, pings, web-based updates, etc.) may comprise a fifth percentage of the ecosystem score (e.g., 22%). It will be appreciated that the ecosystem score may comprise a variety of ecosystem attributes or information and a variety of associated percentages, according to other embodiments of the invention. The electronic updates provide lenders with real time data on their collateral, rather than relying on information from the borrower that may have not been validated or may be outdated.

According to another embodiment, the lender may utilize one or more ecosystem scores according to statistical analysis of other historical ecosystem scores and lending or underwriting results. For example, ecosystem scores that range from 0 to 1000, may be segregated into four different groups. (Group 1) 0-300, (Group 2) 301-600, (Group 3) 601-759, and (Group 4) 760-1000. These four different groups may be based upon historical statistical analysis of lending or underwriting results. Based upon this historical statistical analysis, Group 1 may have a default rate of 50%, Group 2 may have a default rate of 20%, Group 3 may have a default rate of 5%, and Group 4 may have a default rate of 1%. Accordingly, lending decisions such as whether to lend, the interest rate at which to lend, and/or the advance rate, may depend at least in part on the group within which the ecosystem score falls. Indeed, Group 4 would typically receive the best interest rates and advance rates (e.g., lowest interest rate and highest advance rate) while Group 1 would typically receive the worst interest rates and advance rates (e.g., highest interest rate and lowest advance rate). It will be appreciated that the groupings described above are examples, and many variations in the number of types of groupings are available without departing from embodiments of the invention. In an alternative embodiment, the ecosystem attributes may be summarized in ways other than generating scores. Further, there may be some attributes that must be utilized otherwise no financing will be granted regardless of the values associated with the other attributes (e.g., type of goods such as perishables, or visibility of the goods for foreign and/or domestically located inventory, etc.).

FIG. 3 shows the system for monitoring an example supply chain between a foreign supplier 202 and a domestic buyer 204 in accordance with an example embodiment of the invention. In the example supply chain of FIG. 3, a foreign supplier 202 transports its goods via foreign transport 206 to a foreign warehouse 208. The foreign supplier 202 may be a provider of finished goods, unfinished goods, raw materials, or a service requested by the domestic buyer 204. The foreign transport 206 may be employed by the foreign supplier 202 or an "in-country" third-party carrier. Once the goods are at the foreign warehouse 208, an Advanced Shipment Notice (ASN) can be generated and compared against the buyer's 204 purchase order.

An ASN is an electronic notification of pending deliveries that provides instructions to all parties responsible for the movement of freight (e.g., goods or in-transit inventory) from origin to destination. For finished goods, an ASN may include the date of freight availability, equipment number, routing, freight identification, origin, and destination, and other necessary information. For materials, the ASN may include the supplier of record, Standard Carrier Alpha Code (SCAC), a list of part numbers and quantity, destination, conveyance number, actual departure date and time, release identification, vessel number and name, and other information. The ASN may be sent before or after the goods or materials have been dispatched from their origin (e.g., foreign supplier 202). This ASN may be generated by, or otherwise provided to, the supply chain entity 304 and/or the server 302 for distribution to one or more entities of the supply chain, as well as other entities such as the lender 306 or third party logistics entity or an intermediary entity.

Once the purchase order has been matched against the ASN, the confirmation of such a match may be provided to the supply chain entity 304 and/or server 302 for distribution to one or more entities of the supply chain, as well as the lender 306. The goods may then be sent, via foreign transport 210, to the freight forwarder 212. The freight forwarder 212 generates transportation documents, which may include a packing list, insurance certification, and a document indicating the country of origin according to an example embodiment of the invention. Again, these transportation documents may be generated by, or otherwise provided to, the supply chain entity 304 and/or server 302 for distribution to one or more entities of the supply chain, as well as the lender 306.

Next, export customs 214 may examine the shipped goods prior to shipment by international transport 216. The international transport 216 may be through one or more of a plane, train, truck, boat, multi-modal or other mode of transportation and may include one or more segments or stages. Prior to shipment of the goods by international transport 216, a Bill of Lading (BOL) or multi-modal (e.g., air, ship, rail, etc.) BOL is created. A bill of lading is a document issued by a carrier (e.g., ship's master, company shipping department, etc.) that acknowledges that the specified goods have been received as cargo for conveyance to a named place for delivery and is usually signed by the consignor (sender) who is identified in the BOL. The BOL usually incorporates the terms of a contract of carriage between the consignor and the carrier. The BOL also serves as a receipt by the carrier confirming that the specified goods have been received in good condition. According to another embodiment of the invention, the BOL may be a negotiable document, where the negotiable BOL may serve to provide one or more ownership rights to the party in possession of the negotiable BOL.

According to an example embodiment of the invention, the BOL may be electronically generated by, or otherwise provided to, the supply chain entity 304 and/or server 302 for distribution to one or more entities of the supply chain, as well as the lender 306. The physical BOL may then be provided by physical transport means by the supply chain entity 304 to the domestic buyer 204 or the lender 306. However, in another embodiment of the invention, the original BOL, or a variation thereof, may only exist in electronic form (maintained or accessible by the supply chain entity) and could be printed on demand at a remote location (e.g., the lender's 306 offices) while still maintaining its original integrity.

Once the goods have been transported by international transport 216, they are received and inspected by import customs 218 and received by domestic transport 220 for delivery. A proof of delivery document is generated, which states that one party has turned over the cargo to another. The proof of delivery document may be signed and dated, either physically or electronically. The proof of delivery document may be generated by, or otherwise provided to, the supply chain entity 304 and/or server 302 for distribution to one or more entities of the supply chain, as well as the lender 306. The domestic transport 220 then delivers the goods to a domestic warehouse 222. The domestic warehouse 222 issues a warehouse receipt once the goods are received into the warehouse. Again, the warehouse receipt may be generated by, or otherwise provided to, the supply chain entity 304 and/or server 302 for distribution to one or more entities of the supply chain, as well as the lender 306.

Once the goods are requested by the buyer 204, a commercial invoice is issued and, depending upon the shipping terms, title may be transferred to the buyer 204 once the goods leave the domestic warehouse 222. This commercial invoice may be generated by, or otherwise provided to, the supply chain entity 304 and/or server 302 for distribution to one or more entities of the supply chain, as well as the lender 306. The goods are then delivered by the domestic transport 224 to the domestic buyer 204, where a delivery document is generated to verify that the goods were delivered to the buyer's 204 facility. The delivery document may be generated by, or otherwise provided to, the supply chain entity 304 and/or server 302 for distribution to one or more entities of the supply chain, as well as the lender 306. In some example embodiments of the invention, various inventory in-transit may merge (or be combined) with other inventory as it moves from location to location through a process known as kitting. Kitting is where one inventory item and another inventory item are combined and/or re-packaged together as one new inventory item. In an example embodiment of the invention, kitting may include the combination of a stereo component made in and shipped from Vietnam with a speaker component made in and shipped from China.

Other physical supply chain configurations may also be implemented in accordance with embodiments of the invention. As will be appreciated, the example supply chain described in FIG. 3 is provided to better understand the various components of a generic supply chain and to better understand the extent of example embodiments of the invention. Other physical supply chains may have domestic suppliers only, domestic and foreign suppliers, distributors, retailers and other entities that may contribute to the preparation and/or shipment of the goods to consumers. Further, the various domestic and international transportation may be handled by the same carrier entity or multiple carrier entities.

As shown in FIG. 3, the system includes a server 302 in communication with both a supply chain entity 304 and a lender 306. In example embodiments of the invention, the server 302, supply chain entity 304 and lender 306 may all be separate entities, the same entity or a combination of entities. For example, the server 302 may be provided by the supply chain entity 304. According to another example, the server 302 may be provided by the lender 306. According to yet another example, the supply chain entity 304, the lender 306, and the server 302 may be provided by the same entity. According to still another example, the supply chain entity 304 and the lender 306 may be the same entity, which is different from the entity providing the server 302. Other combinations are possible in alternative embodiments of the invention.

As shown in FIG. 3, the supply chain includes many components and/or events, each of which may be a milestone or triggering point that has significance in the lender 306 financing the buyer's 204 or the supplier's 202 goods/assets/receivables. The supply chain entity 304 and/or server 302 has access to one or more points along the supply chain and receives the data associated with the goods being transferred. This information may include the quantity of goods, descriptive elements of the goods, condition of the goods, location of the goods, destination of the goods, anticipated arrival of the goods as well as any other information associated with the goods that would be useful for the supplier 202, buyer 204 and/or lender 306. Although FIG. 3 shows the supply chain entity 304 with access to all distinct points of the example supply chain, alternative embodiments of the invention may have the supply chain entity 304 only monitoring select portions of the supply chain for specific events. Further, there may actually be a plurality of supply chain entities 304, or intermediary entities (e.g., logistics providers, government agencies, other transport entities, etc.) each with respective responsibilities along one or more portions of the supply chain.

The supplier 202 or buyer 204 may use the information provided by the supply chain entity 304 to monitor inventory levels, and to determine when to place additional orders from a particular supplier, as well as other operational decisions. The information provided by the supply chain entity 304 may be utilized by one or more of the supplier 202, the buyer 204, and/or the lender 306 when making various operational and financial decisions. Such "visibility" of the goods provided by the supply chain entity 304 may be accessible by the supplier 202, the buyer 204, and/or the lender 306 through the server 302. It is this independent physical control and associated visibility of the goods that mitigates risks associated with the supply chain, such as dealing with unknown suppliers or unknown buyers, unsecured transportation methods, custom issues, and the like.

The lender 306 may use the information provided by the supply chain entity 304 when making financing decisions (e.g., determining lending rates, advance rates, when to lend, etc.) involving the supplier 202, the buyer 204, or both. Given the visibility of the movement of the goods as they are transported through the supply chain, a lender 306 may consider the inventory as a form of collateral at various points in the supply chain. The treatment of this information (e.g., relating to the visibility of movement of goods) received by the supply chain entity 304 allows for the formation of new financial arrangements between lenders and suppliers and buyers. With this use of the visibility of the movement of goods, the various documents generated at the various points of the supply chain (e.g., Bill of Lading, etc.) may be considered negotiable documents allowing for the availability of additional financing, perhaps at higher advance rates and/or lower interest rates, or earlier in time for some borrowers.

Additionally, the visibility of the supply chain may allow for real-time adjustments to financing arrangements and/or more complex arrangements where the financing changes depending on the completion of particular events occurring in the supply chain. For example, a physical event occurring in the supply chain and monitored through the supply chain entity 304 may automatically trigger a change in the financing arrangement to reflect the decrease (or increase) in the risk associated with the lending. In one example embodiment of the invention, when it has been detected that the in-transit inventory is placed on a ship for transport, the advance rate may automatically change to reflect the decrease in the risk that the inventory may not actually be delivered. In other example embodiments of the invention various automatic trigger events may be employed such as emergency (or "panic button") scenario where the in-transit inventory may have difficulty being delivered due to circumstances beyond the control of the buyer, seller, lender, or supply chain entity (e.g., collapse of local government, sever weather, etc.). Another trigger event may be alerts or warning established by the lender or buyer with the supply chain entity to report on any activity relating to the in-transit inventory outside the scope of the agreed upon financial arrangement with the customer (supplier or buyer). Another trigger event may be automatic default, which allows the supply chain entity to automatically perform a specified act (e.g., seizure of goods, or re-routing delivery of goods to another location) that was directed by the lender and approved by the customer once it has been detected that the terms of the agreed upon financial arrangement with supplier (or buyer) have been violated.

Another advantage of the visibility provided by the supply chain entity 304 and utilized by lenders allows a financial institution to recognize and consider in its financing a symbiotic relationship between the supplier 202 and the buyer 204, which has been introduced above with respect to trade ecosystem. For instance, the supplier 202 of a buyer 204 with an excellent credit rating may obtain some of the financial benefit of the buyer's 204 credit rating if the buyer 204 would agree to take ownership of the goods earlier, or agree to pay earlier, in the supply chain process. The visibility provided by the supply chain entity 304 mitigates the risk associated with the buyer 204 taking ownership of the goods (or the buyer 204 paying earlier in time). In such an arrangement, the lender 306 may finance the supplier 202 at a lower rate (e.g., interest rate) or at a higher advance rate. The cost savings on financing charges may allow the supplier 202 to pass on at least a portion of the cost savings to the buyer 204 by lowering the cost of the goods.

Thus, the visibility of the supply chain provided by the supply chain entity 304 may be utilized to financially optimize a particular supply chain configuration or trade ecosystem. The operation of the server 302 will be discussed in further detail below, as will specific example financial arrangements utilizing the visibility of the supply chain provided by the supply chain entity 304.

The technical effect of the invention will now be described in further detail with reference to FIGS. 4A and 4B. The efficiencies, optimizations, and technical advantages described above and through this application may be implemented and understood in further detail in the below descriptions and references to FIGS. 4A and 4B. The architecture of a server 302 in accordance with an embodiment of the invention will now be discussed with reference to FIG. 4A. As shown in FIG. 4A, the server 302 includes at least one communications interface 402 to permit the server 302 to communicate with one or more of a supply chain entity 304, a lender 306, a supplier, a buyer, and at least one borrower. The borrower may be one or both of the aforementioned supplier and buyer. The interface(s) 402 may be one or more types of communications interfaces and/or drivers for receiving and/or transmitting information, as is well-known to one of ordinary skill in the art. Accordingly, the at least one interface 402 may support communications over a variety of wired and wireless networks, both public and private, and which include the Internet and Electronic Data Exchange (EDI) networks.

Different types of communications over interface(s) 402 may be utilized without departing from embodiments of the invention.

The server 302 also includes a processor 404, operating system 406, bus 408, one or more storage devices 410, and at least one memory 412. The bus 408 includes data and address bus lines to facilitate communication between the processor 404, operating system 406 and the other components within the server 302, including the memory 412, the communications interface(s) 402, and the one or more storage devices 410. According to one embodiment of the invention, the server 302 may represent a system of distributed components that are connected by the bus 408. The processor 404 executes the operating system 406, and together the processor 404 and operating system 406 are operable to execute functions implemented by the server 302, including executing software applications and other modules stored in the memory 412, as is well-known in the art. The memory 412 may include random access memory, read-only memory, a hard disk drive, a floppy disk drive, a CD-ROM drive, a DVD-ROM drive, a flash memory drive, an optical disk drive, or the like, for storing information on various computer-readable media.

The memory 412 can include a supply chain module 413, which may provide the functions described herein to support supply chain finance functionality. For example, the supply chain finance functionality may be associated with payables financing, receivables financing, asset based lending (e.g., inventory financing), inventory ownership financing, container financing, and integrated supply chain financing, as will be described in further detail below. Fewer or additional supply chain finance functionality can be implemented in the supply chain module 413 as necessary. While the supply chain module 413 has been illustrated as a single module, the supply chain module 413 can also be implemented as a plurality of modules without departing from embodiments of the invention.

The supply chain module 413 may be operable to store and retrieve data from the one or more storage devices 410. In particular, the supply chain module 413 may store and retrieve routines, algorithms, and/or instructions for supply chain functionality in logic 422. In addition, the supply chain module 413 may store and retrieve financial supply chain data 418, which may be associated with the borrower and/or lender 306, as well as the physical supply chain data 420, which may be associated with the supply chain entity 304, the supplier, the buyer, and/or other entities with access to the goods as they move between the supplier and buyer.

The financial supply chain data 418 may be documents, document images, data, and/or information associated with one or more of the following: (i) Purchase Order (PO) Processing, (ii) Letters of Credit, (iii) Open Account Management, (iv) Pre & Post Shipment Financing, (v) Invoice Presentment, (vi) Insurance Management, (vii) Receivables Financing, (viii) Global Asset Based Lending, (ix) Payables Financing, and (x) Inventory Financing, (xii) Inventory Ownership financing, (xiii) Container Financing. The physical supply chain data 420 may be documents, data, and/or information associated with one or more of the following: (i) Transportation, (ii) Export/Import Compliance, (iii) Document Management, (iv) Shipment Tracking, (v) Inventory Management, (vi) Global Parts Management, (vii) Security Management, (viii) Contract Management, (ix) Warehousing, and (x) Purchase Order Fulfillment. Although the documents, data, and/or information described immediately above (e.g., financial supply chain data 418 and physical supply chain data 420) are illustrated as being stored separately within the one or more storage devices 410, it should be appreciated that the data may be stored within a single database or location. Alternatively, the data may be stored in distributed and/or redundant databases across multiple locations.

It should be appreciated that although the supply chain module 413 is described herein as software residing within the memory 412, the supply chain module 413 may alternatively include a combination of software and hardware such as firmware, or only hardware. In addition, while the storage device 410 and the memory 412 have been illustrated as being separate, they could also be implemented in the same memory or storage device. Furthermore, although illustrated as located entirely within the server 302, one or more of the server 302 components can be distributed such that they are in whole or in part external to the server 302. As an illustrative example, the one or more storage devices 410 may in fact be external to the server 302.

Further, it also should be appreciated by one of ordinary skill in the art that one or more of the server 302 components described with respect to FIG. 4A may include several components, which are either local to each other, or which operate in conjunction with each other, to permit the supply chain module 413 to perform the processes described herein. One or more of the server 302 components may also be combined and/or may be distributed on different computers, systems, platforms, and the like. For example, one or more of the server 302 components may be provided on handheld devices (e.g., PDAs, mobile phones, laptops, etc.) operated by the supply chain and/or transport entities. Therefore, it should be appreciated that the illustrative server 302 shown in FIG. 4A is example, and that various combinations of software and/or hardware may be utilized to perform the functions described herein.

An example embodiment of the supply chain module 413 residing in the memory 412 of the server 302 will now be discussed in further detail with respect to FIG. 4B. As shown in FIG. 4B, the supply chain module 413 may be comprised of a plurality of component modules. These component modules may include a borrower interface module 402, a lender interface module 404, a security layer module 406, a capital management module 412, a physical/financial data integration module 410, and a physical supply chain visibility module 408. Each of these component modules will be now be discussed in turn below.

The borrower interface module 402 may be accessible to the borrower, perhaps over a web user interface. The borrower interface module 402 may allow the borrower 414 to aggregate transactions (e.g., goods, in-transit inventory) to a user interface, which may be a dashboard view according to an example embodiment of the invention. The borrower 414 may be able to drill down from the dashboard to an individual facility of the borrower 414, and perhaps view the goods supporting that facility. Likewise, the borrower 414 may also view its borrowing or collateral base (e.g., goods, in-transit inventory, etc.) for financing by a lender 306. Additionally, the borrower 414 may be able to enter valuations (e.g., SKU valuations) as well as other related identifying information for its borrowing or collateral base (e.g., tracking inventory values based on publicly available data). The borrower 414 may also be able to view outstanding obligations to one or more lenders.

The lender interface module 404 may be accessible to the lender 306, perhaps over a web user interface. The lender interface module 404 may allow the lender 306 to view the lender's 306 portfolio of accounts (e.g., borrower accounts), which may be accessible via a dashboard view according to an example embodiment of the invention. The lender interface module 404 may also alert a lender 306 when credit tolerances or financial covenants of one or more borrowers 414 are breached or are anticipated to be breached. The lender 306 may also have the capability to view the movement of collateral (e.g., in-transit inventory) of one or more borrowers 414, perhaps according to location, SKU number, invoice, and the like according to an example embodiment of the invention. The lender interface module 404 may also provide the capability of offering loans for underwriting by one or more lenders 306. Likewise, the lender interface module 404 may also provide the capability of offering loans to one or more borrowers 414.

The security layer module 406 may provide security to users who need access to one or more functional components of the supply chain module 413 at the server 302. More specifically, the security layer module 406 may allow users to be assigned or restricted using one or more of the following example criteria: (i) spending authority, (ii) client, (iii) geographic region, and (iv) functional role. Example functional roles can include capital operations, credit, borrower, buyer, seller, and lender (e.g., financial institution). Other criteria and functional roles may be defined without departing from embodiments of the invention. According to an embodiment of the invention, users may be assigned authentication credentials, which may include a username and password. When the user accesses the one or more functional components of the supply chain module 413, the user's access may be restricted according to the authentication credentials. For example, a user that is a borrower may be limited to only borrower-accessible functionality. Similarly, a user that is a lender may be limited to only lender-accessible functionality. Many variations of the security layer module 406 appreciable by one of ordinary skill in the art are available according to other embodiments of the invention.

The physical supply chain visibility module 408 may communicate with the supply chain entity 304 and other parties involved with the movement of goods/inventory along the physical supply chain. The physical supply chain visibility module 408 may perform visibility data validation (e.g., high-level only, data format compliance) according to an embodiment of the invention. In addition, the physical supply chain visibility module 408 may also receive information about the physical disposition of goods/inventory. This information may include one or more of SKU numbers, quantities, unit prices, unit costs, physical locations, and the like of goods and inventory associated with the supply chain. The physical supply chain visibility module 408 may track supply chain milestones that are critical in determining the varying levels of advances (e.g., whether goods have cleared customs or are located in a bonded warehouse, a bonded logistics zone, a bonded logistics center or a free trade zone).

The physical supply chain visibility module 408 may further assess the financial implication of physical supply chain events (e.g., location of goods or in-transit inventory; creation of one or more transportation documents; physical shipments not meeting milestone dates; damage of goods in transport; goods delayed, segregated or quarantined in shipment, etc.) and, if appropriate, send alerts to the capital management module 412 (e.g., violations and exceptions to procedures, covenant or ratio exceptions or violations, other compliance issues, etc.). The physical supply chain visibility module 408 may also have the capability to intrude into the physical supply chain. For example, such intrusion may involve authorizing shipment release, preventing shipment release, segregating certain goods or redirecting of shipment when instructed by the lender 306 and/or supported by contractual terms. This intrusion will be discussed in further detail according to FIG. 5.

The physical/financial data integration module 410 may be operative to match or reconcile physical supply chain data with financial supply chain data, according to an example embodiment of the invention. For example, records may be matched or reconciled using one or more of the following: borrower 414 identification (ID), loan ID, order number, invoice number, SKU, and the like. The physical/financial data integration module 410 may also use the physical movement of goods to update the borrower's 414 collateral balance or base. For example, certain goods may not be included in the borrower's 414 collateral balance or base until received in the country of the lender 306 or another supply chain milestone event. In addition, the advance rate on the borrower's 414 collateral balance or base may change (e.g., increase) as the goods move closer towards the buyer 418. When inventory valuation is provided outside of the physical supply chain visibility module 408, the physical/financial data integration module 410 may match the physical movement of the goods with valuation provided by supplier 416.

The capital management module 412 may provide an operating platform for both transactional and revolving credit contracts. The capital management module 412 may also support back-office operations. In addition, the capital management module 412 may provide a view (e.g., a dashboard view or some type of system integration) of a portfolio to a capital operations entity, which may be a separate entity from a lender 306 and the supply chain entity 304, or may be the same as one of the aforementioned entities. Further, electronic management of risk assessment criteria (RAC) may be provided. The RAC may be associated with the trade ecosystem attributes and information, or the ecosystem scoring described above, according to an example embodiment of the invention. The capital management module 412 may also monitor lender 306 activity and approve or disapprove the movement of goods when a lockbox account is not in compliance with contractual terms. The capital management module 412 may also maintain an audit trail of every database update with user ID and date/time stamp. Moreover, the capital management module 412 may provide the ability to enter data manually and approve or decline credit applications.

Also shown in FIG. 4B, is a third party intermediary 420 in communication with the server 302. Third party intermediaries 420 may be any of a variety of information sources. A third party intermediary 420 may be a logistics provider or software provider working in combination with the transporting entity to provide data relating to the in-transit inventory's condition, location, status and any other information that may be useful to the lender, seller or buyer. The third party intermediary 420 may be a government agency, customs, or similar entity that also may provide data relating to the in-transit inventory's condition, location, status and any other information that may be useful to the lender, seller or buyer.

FIG. 5A illustrates an example financially optimized related trade ecosystem ("F.O.R.T.E") 500 according to an embodiment of the invention. According to FIG. 5A, the server 302 may be in communication with the lender 306, the supply chain entity 304, and a supplier 502. Although not explicitly illustrated, the buyer 504 may also be in communication with the server 302. According to an example embodiment of the invention, the lender 306 may provide credit or lending rules 508 to the server 302. These credit or lending rules 508 may provide which assets/goods may be used as collateral for financing, the timing of financing for such collateral, advance rates for lending against the collateral, and the protocol regarding preventing, authorizing or redirecting shipments of the collateral.

In FIG. 5A, the supplier 502 may receive a purchase order 506 from the buyer 504. The purchase order 506 may be provided to the supplier 502 via the server 302. However, the purchase order 506 may be provided to the supplier 502 through other means as well, including facsimile, e-mail, and physically transported mail. The supplier 502 may prepare and then provide a shipment request 510 to the server 302 and provide the goods 512 to the supply chain entity 304. The server 302 then approves or denies shipment of the goods 512 at one or more points along the supply chain. This approval or denial may be based upon the server 302 receiving input from one or more of the lender 306, the buyer 504, and the supplier 502. For example, approval for shipment of the goods 512 may be based upon an approval signal from one or more of the lender 306, the buyer 504, and the supplier 502. For example, the server 302 may deny shipment of the goods 512 when the server 302 receives notice from a lender 306 that a borrower's lock-down account (e.g., a lockbox of the supplier 502) is out of tolerance (e.g., in violation of contractual terms).

Furthermore, when the goods 512 are in-transit (e.g., in-transit inventory, inventory in a bonded logistics park, etc.) along the supply chain en route to the buyer 504, the server 302 may be able to redirect (or deny) shipment of the goods 512. For example, should the contractual terms of the financing not be met by the supplier 502, the shipment of the goods 512 along the supply chain may be stopped at a certain location or redirected by the server 302. For example, based upon the credit or lending rules 508 provided by the lender 306, the server 302 may redirect the goods 512 to a warehouse of the supply chain entity 304 for certain contractual defaults by the supplier 502.

FIG. 5B illustrates an alternative to the embodiment of FIG. 5A. In particular, in accordance with an example embodiment of the invention, the supply chain entity 304 may generate the purchase order 506 on behalf of the buyer 504. The supply chain entity 304 may then provide the purchase order 506 to the supplier 502. According to another example embodiment of the invention, the buyer may generate the purchase order 506 and provide the purchase order 506 to the supply chain entity 304, as illustrated by the dotted lines in FIG. 5B. The supply chain entity 304 may then provide the purchase order 506 to the supplier 502. It will be appreciated that variations of aspects of FIGS. 5A and 5B are available without departing from embodiments of the invention.

FIG. 5C illustrates an alternative to the embodiment of FIGS. 5A and 5B. In particular, FIG. 5C shows a scenario where an intermediary party obtains ownership of the inventor provided by the supplier in order to create an advantageous financing arrangement for one or more parties. The intermediary may be the a financial institution, the lender 306, the supply chain entity 304 itself, or other party. In accordance with an example embodiment of the invention shown in FIG. 5C, a demand plan is sent from the buyer 504 to the supply chain entity 304. The supplier 502 receives a purchase order from the supply chain entity 304 and sends the goods to an intermediary 506 who becomes the inventory owner. Payment to the supplier is sent via the supply chain entity 304. The lender 306 supplies the supply chain entity 304 with lending terms (or business rules) to apply when monitoring the supply chain visibility associated with the intermediary 506. The buyer 504 supplies the purchase order to the intermediary 506. The intermediary provides the goods and invoice to the buyer in exchange for payment.

The description of FIGS. 6A-12 below provides various example embodiments of supply chain financing utilizing the visibility of in-transit inventory including payables financing, receivables financing, asset based lending (e.g., inventory financing), inventory ownership financing, container financing, and integrated supply chain financing. FIG. 6A shows an example embodiment of an international payables discounting system in accordance with an embodiment of the invention. Payables discounting lengthens the buyer's payable days by extending payment terms for suppliers while providing lower cost financing for suppliers by leveraging the credit rating of the buyer. As shown in the example embodiment of FIG. 6A, an example payables discounting system includes an arrangement between a buyer 612 and a supplier (or seller) 602 of goods, where an independent third party (not shown) collects the payment of a buyer-confirmed payable created in the course of the buyer's 612 and supplier's 602 dealings. In an example embodiment of the invention, the independent third party receives information from a supply chain entity 304, which has control and access to the supplier's 602 inventory at various points in the supply chain with the buyer 612, such as foreign and domestic warehouse locations 604 and 608, respectively, or foreign or domestic transit systems 606 and 610, respectively, provided in that particular supply chain. Such an arrangement may have various benefits to both the buyers 612 and the suppliers 602.

For buyers 612, outsourcing the payables function to an independent third party that provides increased accuracy and timeliness associated with the visibility of goods in the supply chain may improve the buyer's 612 cash flow, extend payment terms, and reduce banking costs. Further, any benefit to the supplier 602 by reducing the cost of financing goods in the supply chain may result in a lower cost of goods to the buyer 612, and ultimately, perhaps to the end consumer 614. The benefits to the supplier 602 of reducing the cost of financing goods in the supply chain may potentially prompt an increase in the volume of sales from the supplier 602 to the buyer 612.

For suppliers 602, many financial benefits are derived from a payables arrangement where an independent third party provides increased accuracy and timeliness associated with the visibility of goods in the supply chain. Such an arrangement offers a supplier 602 an alternative source of funding. For instance, the option to accept early payment at a discount improves the cash flow by reducing the days of outstanding payables, and may result in a higher percentage of invoice total than a margined line of credit and/or factored receivable. The visibility of the supply chain provided by the independent third party also lowers the cost of funds (financing) incurred by the supplier 602. The use of the independent third party also provides the supplier 602 the assurance and confirmation of the buyer's 612 promise to pay. This arrangement utilizing the independent third party's visibility of the supply chain also may reduce banking costs, reduce accounts receivable processing costs, and reduce the credit risk associated with the supplier 602. Such payables arrangements may also strengthen the business relationship between the buyer 612 and supplier 602 and may even provide an alternative to letters of credit.

FIG. 6B illustrates an example domestic payables financing system, according to an embodiment of the invention. As shown in the example embodiment of FIG. 6B, an example domestic payables discounting system includes an arrangement between a buyer 622 and a supplier (or seller) 616 of goods, where an independent third party (not shown) collects the payment of a buyer-confirmed payable created in the course of the buyer's 622 and supplier's 616 dealings. In an example embodiment of the invention, the independent third party receives information from a supply chain entity 304, which has control and access to the supplier's 616 inventory at various points in the supply chain with the buyer 622 such as domestic warehouse locations 618 or domestic transportation systems 620 provided in that particular supply chain. Such an arrangement may have various benefits to both the buyers 622 and the suppliers 616 similar to those benefits discussed above with reference to the payables financing system described in FIG. 6A including reducing the cost of financing goods in the supply chain, which may result in a lower cost of goods to the buyer 622, and ultimately, perhaps to the end consumer 624.

The operation of payables financing will now be discussed with reference to the flowchart of FIG. 7. As shown in the example embodiment of FIG. 7, a payables product transaction is initiated where the buyer 612 agrees in advance to the payables arrangement with the seller 602 and the independent third party (block 704). In accordance with this payables arrangement, the buyer 612 orders goods from the seller 602 (block 706). As illustrated in block 708, a determination is made as to whether the seller 602 elects early payment for the payable created by the buyer's 612 purchase order. If the seller 602 elects early payment, then the independent third party purchases the seller's 602 account receivable at a discount and advances the discounted payment to the seller 602 at the time of purchase, less any fees charged by the independent third party for providing such services (block 710), and the full payment is collected from the buyer (block 712). The discount rate may be determined based upon an examination of the ecosystem to which the seller 602 belongs, according to an example embodiment of the invention. As an example, without early payment, the seller 602 may expect payment of $15,000 within 45 days after shipment of the goods. However, with early payment, the seller 602 may instead receive $14,200 at five days after shipment of the goods. Accordingly, in this early payment scenario, the discount rate is 5% for receiving payment 40 days earlier. If the seller 602 does not elect early payment, then block 714 is invoked where the independent third party collects funds from the buyer 614 as stated in the original sales terms, and block 716 is then invoked where the independent third party remits the full invoice amount to the seller 602, less any fees charged by the independent third party for providing such services.

FIG. 8A shows an example embodiment of an international receivables financing system in accordance with an embodiment of the invention. Increasingly, buyers, and especially larger buyers, have been forcing suppliers to move from letters of credit or cash in advance to open accounts. With open accounts, suppliers may be expected to ship goods to the buyers without any guarantee of payment—that is, there may not be any formal debt contract between the buyers and sellers. In this open accounts scenario, receivables-based financing in accordance with an embodiment of the invention may provide the necessary financing to buyers. More specifically, in accordance with an embodiment of the invention, receivables financing may provide financing for a supplier based upon the assignment of an invoice from the supplier to a financial institution. Based upon the assigned invoice, the financial institution may, in turn, provide financing, credit risk protection, accounts receivable bookkeeping, and collection services for the supplier.

As shown in the example embodiment of FIG. 8A, an example receivables financing system includes an arrangement between a buyer 812 and a supplier (or seller) 802 of goods where an independent third party (not shown) purchases or finances (on a recourse or non-recourse basis) invoices (accounts receivables) of the supplier 802. The independent third party 406 then collects the payments from the buyer 812 for the outstanding invoice (accounts receivable). In an example embodiment of the invention, the independent third party receives information from a supply chain entity 304, which has control and access to the supplier's 802 goods or in-transit inventory at various points in the supply chain with the buyer 812, such as foreign and domestic warehouse locations 804 and 808, respectively, or foreign or domestic transit systems 806 and 810, respectively, provided in that particular supply chain. Such an arrangement may have various benefits to both the buyers 812 and the suppliers 802.

According to one aspect of the invention, suppliers 802 may obtain financing at earlier stages in the supply chain. The supplier 802 may also obtain higher advance rates against approved invoices from the independent third party. Likewise, by assigning invoices to the independent third party, the buyer 812 credit risk—that is, the chance that the buyer 812 may default on a payment—may be eliminated for the supplier 802. Accordingly, collection costs would also be reduced for the supplier 802. According to another aspect of the invention, the buyer 812 may increase working capital by eliminating the use of letters of credit. The buyer 812 can also negotiate better or extended payment terms with the independent third party to which the invoice has been assigned. The net result is enhanced financial stability for the supplier 802 as well as the buyer 812. Furthermore, the lowered cost of financing for the supplier 802 may be passed on to the buyer 812, and perhaps ultimately to the end consumer 814.

FIG. 8B illustrates an example domestic receivables financing system, according to an embodiment of the invention. As shown in the example embodiment of FIG. 8B, an example domestic receivables financing system includes an arrangement between a buyer 822 and a supplier (or seller) 816 of goods where an independent third party (not shown) purchases or finances (on a recourse or non-recourse basis) invoices (accounts receivable) of the supplier 816. The independent third party 406 then collects the payments from the buyer 822 for the outstanding invoice (accounts receivable). In an example embodiment of the invention, the independent third party receives information from a supply chain entity 304, which has control and access to the supplier's 816 goods or in-transit inventory at various points in the supply chain with the buyer 822, such as domestic warehouse locations 818 or domestic transportation systems 820 provided in that particular supply chain. Such an arrangement may have various benefits to both the buyers 822 and the sellers 816, similar to those benefits discussed above with reference to the payables financing system described in FIG. 6A. The benefits include lowered cost of financing for the supplier 816 that may be passed on to the buyer 822, and perhaps ultimately to the end consumer 824.

The operation of receivables financing will now be discussed with reference to the flowchart of FIG. 9. Referring to FIG. 9, a seller 802 begins by submitting one or more invoices (accounts receivable) to an independent third party (e.g., a lender) through the server 302 for approval for purchase or assignment (block 904). The independent third party may be a financial institution lender, a non-financial institution lender, or a factor, as known to those of ordinary skill in the art. The independent third party determines whether to approve the invoice for financing in block 906. According to an embodiment of the invention, the independent third party may determine whether to approve the invoice for financing based upon one or more of the following. (i) whether the purchase order matches the ASN and (ii) an inspection/certification of the goods (e.g., SKU, quality, quantity, condition, etc.) at the warehouse 804. For example, if the independent third party receives an indication from the server 302 that the purchase order matches the ASN and the inspection/certification of the goods at the warehouse 804 was acceptable, then the independent third party may approve the invoice for financing (block 906).

Once the invoice has been approved by the independent third party, the supplier 802 can accelerate the order-to-cash cycle by a sale or assignment of the invoice (account receivable) to the independent third party (block 908). This sale or assignment of the invoice may be at a discount to the face value of the account receivable. The discount may be determined based upon the supplier 802 or the trade ecosystem to which the supplier 802 belongs. As an example, a $10,000 invoice may be payable by the buyer 812 to the supplier 802 within 30 days following receipt of the goods by the buyer 812 (with a transmit time of 6 days). In exchange for a sale or assignment of the $10,000 invoice (accounts receivable) to the independent third party within 3 days following shipment of the goods, the seller (e.g., supplier 802) may receive payment of $9,700. In this case, the discount would be 3% of the stated invoice value for the assignment of the invoice (accounts receivable) to the independent third party.

Proceeds from the sale or assignment of the invoice are then provided to the supplier 802. These proceeds may be electronically provided (e.g., bank wire, ACH, and the like) by the independent third party to an account of the supplier 802. When the invoice has been assigned to the independent third party, the independent third party instructs the buyer 812 to route supplier 802 payments on the due date to the lender (block 910). In an example embodiment of the invention, monies could be advanced at an earlier point prior to buyer acceptance.

FIG. 10 shows an example embodiment of a global asset-based lending system in accordance with an embodiment of the invention. The rise in global outsourcing continues to impact and complicate the financial supply chain. More specifically, when a borrower moves one or more parts of its manufacturing base to a foreign country or region (e.g., China, Vietnam, Eastern Europe, Latin America, Western Europe, etc.), the borrower's offshore inventory is typically not included in the "borrowing base" or "collateral" by lenders. Accordingly, many borrowers face liquidity constraints due to the inability to monetize their offshore inventory. Even where lenders include offshore inventory within the borrowing base, the lender typically reduces the advance rates for financing the offshore inventory portion of the borrowing base. Accordingly, embodiments of the invention may provide for global asset-based lending to enable borrowers to monetize their offshore inventory (and the associated accounts receivable) warehoused in a foreign country or in-transit to or from a foreign country. As will be described in further detail below, global asset-based lending may reduce lending risks of lenders by utilizing one or both of visibility and control of goods in the supply chain.

As shown in the example embodiment of FIG. 10, an example global asset-based lending system includes an arrangement between a buyer 1012 and a seller (or supplier) 1002 of goods where an independent third party (not shown) provides financing based upon goods or in-transit inventory moving along the supply chain. In an example embodiment of the invention, the independent third party receives information from a supply chain entity 304, which has control and access to the seller's 1002 goods and/or in-transit inventory at various points in the supply chain with the buyer, such as foreign and domestic warehouse locations 1004 and 1008, respectively, or foreign or domestic transit systems 1006 and 1010, respectively, provided in that particular supply chain.

According to an embodiment of the invention, the operation of global asset-based lending will now be discussed with reference to the flowchart of FIG. 11. As shown in FIG. 11, the borrower (e.g., supplier 1002) submits information regarding inventory in foreign countries, or in-transit inventory, to an independent third party for approval of financing (block 1104). The independent third party may be a financial institution lender or a non-financial institution lender, as known to those of ordinary skill in the art. The information regarding inventory in foreign countries, or in-transit inventory, may be confirmed by the supply chain entity 304 and updated on the server 302. The supply chain entity 304 provides information confirming or denying borrower's information to the lender for approval of financing (block 1106). Based upon the inventory visibility information received from the borrower and/or supply chain entity 304, which may be accessed via the server 302, the independent third party can determine whether or not to approve financing for the borrower, taking as collateral the inventory in foreign countries or in-transit inventory (block 1108). The independent third party's approval may be based upon the server 302 receiving certain confirmation from the supply chain entity 304 regarding the quantity, identity (e.g., SKI), location and value of the goods or in-transit inventory. The independent third party's approval may also be based upon an agreement by the borrower to allow the independent third party to collect funds from the borrower (e.g., supplier 1002) via a lockbox arrangement. The independent third party's approval may further be based upon receiving authorization from the borrower of rights to control the movement of the goods or in-transit inventory or to otherwise intrude into the physical supply chain.

According to an embodiment of the invention, this right to control the movement of the in-transit inventory or to otherwise intrude into the physical supply chain may be based upon a contractual agreement between the borrower and the independent third party, whereby if certain terms of the financing occur (e.g., a default), the independent third party may refuse to authorize shipment release or may otherwise redirect, foreclose, repossess and/or take ownership of the goods or in-transit inventory. According to another embodiment of the invention, this right to control movement of the goods or in-transit inventory may also be based upon a negotiable bill of lading or a warehouse receipt. More specifically, ownership of the goods or in-transit inventory may be based upon the borrower consigning the negotiable bill of lading or a warehouse receipt to the independent third party. Because the lender has a right to control movement of the in-transit inventory, the lender may redirect the in-transit inventory to its own warehouse and/or otherwise take ownership or possession of the in-transit inventory, as described previously with respect to FIG. 5, should the borrower default on one or more terms of the financing. In addition, depending upon the laws of the jurisdiction where the inventory is located, the right to control the movement of the goods and the access to detailed information about the goods may enable the lender to obtain a better or higher priority lien position against the goods. The right to control the movement of the goods and the access to detailed information about the goods may enhance the lender's ability to exercise certain contractual rights against the inventory. Where the independent third party provides approval of financing to the borrower based upon the collateral interest in the goods or in-transit inventory, the lender advances the funds to the borrower, taking as collateral the inventory in foreign country or in-transit inventory (block 1110). The lender receives loan repayment from borrower (block 1112).

In other embodiments of the invention, lenders may take an ownership interest of the in-transit inventory. For instance, when the borrower violates the covenants contained in the financing agreement, the financier may then, through the supply chain entity, intrude into the supply chain an assume ownership of the inventory. Supply chain intrusion provides financial institutions with assurance that should the need arise, assets may be seized. The supply chain entity is in the position to control the in-transit inventory, and therefore may control the flow of the inventory (e.g., where the in-transit inventory is ultimately delivered or stored). This provides assurance to a lender from a third party that the collateral will be readily obtainable in the event of a borrower violating the provisions of the financing agreement.

In one embodiment of the invention, the borrower, financial institution and the transport (or logistics provider) will enter into a contractual agreement authorizing the transport (or logistics provider) to seize the collateral if and when the borrower falls outside the terms of the loan agreement with the financial institution. The determination of when the borrower falls outside the terms of the loan agreement may be made by the transport (or logistics entity) or by the financial institution. The information obtained during the transport of the inventory will be used when making such a determination. When a seizure is to take place, the transport (or logistics entity) will then follow the contractual steps to secure the collateral (e.g., the in-transit inventory). These steps may include shipping inventory to another location such as a warehouse, shipping inventory to a liquidator, holding the inventory in a warehouse until the borrow remedies the violation of the contractual agreement, or other procedures appreciable by one of ordinary skill in the art.

Other financing arrangements may be implemented where the supply chain entity takes an ownership interest in the goods in-transit. For example, container financing is a financing arrangement available where the supply chain entity takes a collateral interest in at least a portion of the in-transit inventory. In this scenario, the supply chain entity is acting as the financial institution and has all of the capabilities and financing options available to financial institution described herein. Container financing may be beneficial to smaller companies who often have a harder time obtaining financing from traditional lending institutions. With container financing, businesses importing international goods can obtain working capital much sooner in their supply chains. Container financing works well for customers importing relatively smaller loads (e.g., between 1 and 5 containers of goods every month). In an example embodiment of the container financing, ocean or air freight services and International Trade Management (ITM) services are used. The lender is able to finance inventory in-transit (and may provide cargo insurance) because of the visibility information obtained and managed by the supply chain entity (and/or logistics entity or third party intermediary). By utilizing such visibility and control, buyers and suppliers may access funds much sooner in the supply chain. Other benefits the may accrue from container financing include the supply chain becoming more efficient.

FIG. 12 illustrates an example container financing operation, according to an embodiment of the invention. The container financing system provides opportunities for financing as goods are provided from the supplier 1202 to the buyer 1212. As illustrated in block 1252, a purchase order is sent to the supplier 1202. Next, the transport entity picks-up goods at the supplier 1202 and delivers them to the port 1204, as illustrated in block 1254. Next at block 1256, the buyer 1212 is invoiced and takes title of the goods. At this point, the lending entity (which may be a third party lender or the supply chain entity 304 itself) pays supplier 1202 for the goods received and financing begins for the buyer 1212, as illustrated in blocks 1258 and 1260. Next, the goods are loaded onto the transit 1206 (e.g., ship, plane, etc.) and eventually arrive in the U.S. and clear customs 1208 as illustrated in blocks 1264 and 1266. The goods are then transported by a domestic transport entity 1210 (which may or may not be affiliated with the foreign transport entity) and information regarding the state and condition of the goods is determined as illustrated in block 1268. The goods are delivered to their destination such as a warehouse, distribution centers, stores, factories, or end customers, etc. as illustrated in block 1270. Finally, the buyer 1212 pays the lender for the invoice amount plus the financing costs based on the invoice date and the terms of the financing as illustrated in block 1272. In an example embodiment of the invention, this payment occurs sixty days or more from the placement of the purchase order to the supplier 1202.

According to an embodiment of the invention, combinations of aspects of the payables financing system, the receivables financing system, the global asset based lending system and other financial arrangements (e.g., inventory ownership, etc.) may be provided according to an example integrated supply chain financing system. Generally, integrated supply chain financing may allow borrowers to monetize their warehoused or in-transit inventory (and associated accounts receivable) by minimizing lending or underwriting risks through the visibility and control of goods in the supply chain. This may provide advantages to both suppliers and buyers.

As will be described in further detail below, financing may be provided for goods at the supplier's factory or in-transit to the buyer, thereby providing access to additional capital. The buyer may also be able to optimize its balance sheet and create better cash flow availability, which may result in improved profitability. The buyer may also be able to improve its net cash conversion cycle and delay ownership risk of goods or in-transit inventory. For a supplier, financing may be obtained earlier in the supply chain. The supplier may further leverage the buyer's credit strength to obtain a favorable cost of funds. Moreover, the supplier, as well as the buyer, may have visibility of goods throughout the supply chain.

FIG. 13 illustrates an example operation of an integrated supply chain financing system, according to an embodiment of the invention. The integrated supply chain financing system provides opportunities for financing as goods are provided from the supplier 1302 to the buyer 1312. As illustrated in block 1352, the buyer's 1312 inventory may be forecasted to the supplier 1302, or otherwise, a purchase order may be provided to the supplier 1302. Based upon this inventory forecast (or purchase order), the supplier 1302 may prepare the necessary goods for the buyer 1312. While the goods are at the supplier's 1302 factory, a trigger may be provided for pre-export financing to the supplier 1302 from the lender. This trigger may be based upon the server 302 receiving an indication of the goods (e.g., SKU, quantity, valuation, etc.) at the supplier's 1302 factory from the supplier 1302 or the supply chain entity 304. At the pre-export financing stage, the advance rate may be relatively lower-perhaps about 50% to 70%. Likewise, the offered interest or discount rate may be slightly higher. According to an embodiment of the invention, the interest or discount rate may be a base rate (e.g., the current LIBOR (London Interbank Offered Rate)) plus a comparatively higher spread. It will be appreciated that the base rate and the spread may vary according to an embodiment of the invention.

In block 1356, transit picks up the goods at the supplier 1302 for delivery to the warehouse 1304. As shown by block 1358, a first funding trigger may be provided by the supply chain entity 304 to the server 302 for in-transit inventory financing to the supplier 1302 when transit picks up goods at the supplier 1302 and/or when the goods are delivered to the warehouse 1304. Likewise, as transit 1306 consolidates and ships the goods from the warehouse 1304 (block 1360), a second funding trigger may be provided by the supply chain entity 304 to the server 302 for in-transit inventory financing to the supplier 1302 (block 1362). Additionally, when the goods arrive at the warehouse 1308 (block 1364), a third funding trigger may be provided by the supply chain entity 304 to the server 302 for in-transit inventory financing to the supplier 1302 (block 1366) With each of these three funding triggers, transit may be able to provide the server 302 with confirmation of the goods (e.g., SKU, quantity, valuation, condition, etc.). At each of these funding trigger stages, the advance rate may be the same as, or higher than, the advance rate at the pre-export financing stage. According to an embodiment of the invention, the advance rate may be 50-85% of the inventory valuation. Likewise, the interest or discount rate may be a base rate (e.g., LIBOR) plus a comparatively lower spread. The higher advance rate and lower interest or discount rate reflects the lender's additional comfort with lending based upon the confirmation provided by the supply chain entity 304 and its ability to stop or redirect movement of the goods via the server 302 and the supply chain entity 304.

Next, freight 1310 may pick up goods at the warehouse 1308 (block 1368), and the buyer 1312 may be invoiced for the goods and may also take title of the goods (block 1370). As illustrated in block 1372, the buyer 1312 may negotiate extended terms with the supplier 1302. The lender may then purchase supplier's 1302-extended terms receivables from the buyer 1312. The lender may finance the receivables at a base rate (e.g., LIBOR) plus a spread, according to an example embodiment of the invention. Alternatively, the lender may provide the supplier 1302 with a discounted amount of the receivables, where the discount may be determined at least in part from the base rate (e.g., LIBOR) plus any spread. The buyer 1310 may then pay the invoice amount at maturity to the lender (block 1376).

Many modifications and other embodiments of the inventions set forth herein will come to mind to one skilled in the art to which these inventions pertain, having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computerized method for providing supply chain financing, comprising:
    receiving a request to finance an asset of a borrower, wherein the asset is associated with inventory provided by a supplier to a buyer under the control of a supply chain/logistics entity;
    evaluating, by one or more computers, a plurality of attributes of a trade ecosystem associated with the supplier and the buyer, wherein the plurality of the attributes include at least one first attribute associated with a reorder rate of the inventory from the supplier by the buyer, and at least one second attribute characterizing a length of relationship between the supplier and the buyer;
    determining, by one or more computers, to finance the asset based at least in part on the evaluated attributes;
    arranging, by one or more computers, for the financing of the asset from a lender, wherein at least one term of a plurality of financing terms permits the lender control over movement of the inventory both before and after default of one of the plurality of financing terms;
    receiving, by one or more computers, information associated with the movement of the inventory along a supply chain;
    determining, by one or more computers based upon the received information, that a physical supply chain event has occurred while the inventory is in-transit along the supply chain; and
    automatically adjusting, by one or more computers in accordance with at least one term of the plurality of financing terms, an advance rate defined by a percentage of a valuation of a borrower's collateral for the financing from a first advance rate to a second advance rate, wherein the automatic adjustment is based upon the determination that the physical supply chain event has occurred while the inventory is in-transit along the supply chain.

2. The computerized method of claim 1, wherein the borrower is at least one of the supplier and the buyer.

3. The computerized method of claim 1, wherein the plurality of attributes of the trade ecosystem are associated with one or more of (i) the supplier, (ii) the buyer, (iii) a relationship between the supplier and the buyer, or (iv) the inventory provided from the supplier and the buyer.

4. The computerized method of claim 1, further comprising:
    collecting payment at a time earlier than specified in the plurality of terms of financing, wherein the collected payment is a discounted payment.

5. The computerized method of claim 1, wherein control over movement of the inventory includes at least one of stopping further movement of the inventory or redirecting movement of the inventory.

6. The computerized method of claim 1, wherein the supply chain/logistics entity is the lender.

7. The computerized method of claim 1, wherein the asset is at least one of (i) an accounts payable related to the inventory, (ii) an accounts receivable related to the inventory, or (iii) the inventory.

8. The computerized method of claim 1, wherein the inventory includes in-transit inventory.

9. The computerized method of claim 1, wherein the inventory includes inventory located in at least one of a warehouse, a bonded logistics park, or a free trade zone.

10. The computerized method of claim 7, wherein the asset is the accounts receivable, and wherein the financing of the asset comprises purchasing the accounts receivable at a discount.

11. The computerized method of claim 10, wherein the lender receives payments associated with the purchased accounts receivable.

12. A computerized system for providing supply chain financing, comprising:
    a memory for storing executable instructions;
    a processor in communication with the memory, wherein the processor is operable to execute the stored executable instructions to:
        receive a request to finance an asset of a borrower, wherein the asset is associated with inventory provided by a supplier to a buyer under control of a supply chain/logistics entity;
        communicate the request for financing to a lender, wherein the lender evaluates a plurality of attributes of a trade ecosystem associated with the supplier and the buyer to determine a plurality of financing terms for the asset, wherein the plurality of attributes include a first attribute characterizing a length of first historical relationship between the supplier and the buyer, and a second attribute characterizing a second historical relationship of either the supplier or buyer to another entity outside of the trade ecosystem;

receive, from the lender, acceptance of the request for financing, wherein at least one term of the plurality of financing terms permits the lender control over movement of the inventory both before and after default of one of the plurality of financing terms;

receive information associated with the movement of the inventory along a supply chain;

determine, based upon the received information, that a physical supply chain event has occurred while the inventory is in-transit along the supply chain; and automatically adjust, in accordance with at least one term of the plurality of financing terms, an advance rate defined by a percentage of a valuation of a borrower's collateral for the financing from a first advance rate to a second advance rate, wherein the automatic adjustment is based upon the determination that the physical supply chain event has occurred while the inventory is in-transit along the supply chain.

13. The computerized system of claim 12, wherein the borrower is at least one of the supplier or the buyer.

14. The computerized system of claim 12, wherein the plurality of attributes of the trade ecosystem are associated with one or more of (i) the supplier, (ii) the buyer, (iii) a relationship between the supplier and the buyer, or (iv) the goods provided from the supplier and the buyer.

15. The computerized system of claim 12, wherein the processor is further operable to execute the stored instructions to:
collect payment at a time earlier than specified in the plurality of terms of financing, wherein the collected payment is a discounted payment.

16. The computerized system of claim 12, wherein control over movement of the inventory includes at least one of stopping further movement of the inventory or redirecting movement of the inventory.

17. The computerized system of claim 12, wherein the supply chain/logistics entity is the lender.

18. The computerized system of claim 12, wherein the asset is at least one of (i) an accounts payable related to the inventory, (ii) an accounts receivable related to the inventory, or (iii) the inventory.

19. The computerized system of claim 12, wherein the inventory includes in-transit inventory.

20. The computerized system of claim 12, wherein the inventory includes inventory located in at least one of a warehouse, a bonded logistics park, or a free trade zone.

21. The computerized system of claim 18, wherein the asset is the accounts receivable, and wherein the processor is further operable to execute the stored instructions to purchase, in accordance with the acceptance of the request for financing, the accounts receivable by a lender at a discount.

22. The computerized system of claim 21, wherein the lender receives payments associated with the purchased accounts receivable.

23. A computerized method for providing supply chain financing, comprising:
receiving, by one or more computers, a request to finance an asset of a borrower, wherein the asset is associated with inventory provided by a supplier to a buyer under control of a supply chain/logistics entity;

communicating, by one or more computers, the request for financing to a lender, wherein the lender evaluates a plurality of attributes of a trade ecosystem associated with the supplier and the buyer to determine a plurality of financing terms for the asset, wherein the plurality of attributes include a first attribute characterizing a length of first historical relationship between the supplier and the buyer, and a second attribute characterizing a second historical relationship of either the supplier or buyer to another entity outside of the trade ecosystem;

receiving, by one or more computers from the lender, acceptance of the request for financing, wherein at least one term of the plurality of financing terms permits the lender control over movement of the inventory both before and after default of one of the plurality of financing terms;

receiving, by one or more computers, information associated with the movement of the inventory along a supply chain;

determining, by one or more computers based upon the received information, that a physical supply chain event has occurred while the inventory is in-transit along the supply chain; and automatically adjusting, by one or more computers in accordance with at least one term of the plurality of financing terms, an advance rate defined by a percentage of a valuation of a borrower's collateral for the financing from a first advance rate to a second advance rate, wherein the automatic adjustment is based upon the determination that the physical supply chain event has occurred while the inventory is in-transit along the supply chain.

24. The computerized method of claim 23, wherein the borrower is at least one of the supplier or the buyer.

25. The computerized method of claim 23, wherein the plurality of attributes of the trade ecosystem are associated with one or more of (i) the supplier, (ii) the buyer, (iii) a relationship between the supplier and the buyer, or (iv) the goods provided from the supplier and the buyer.

26. The computerized method of claim 23, further comprising:
arranging, by one or more computers, for collecting payment at a time earlier than specified in the plurality of terms of financing, wherein the collected payment is a discounted payment.

27. The computerized method of claim 23, wherein control over movement of the inventory includes at least one of stopping further movement of the inventory or redirecting movement of the inventory.

28. The computerized method of claim 23, wherein the supply chain/logistics entity is the lender.

29. The computerized method of claim 23, wherein the asset is at least one of (i) an accounts payable related to the inventory, (ii) an accounts receivable related to the inventory, or (iii) the inventory.

30. The computerized method of claim 29, wherein the asset is the accounts receivable, and wherein the processor is further operable to execute the stored instructions to purchase, in accordance with the acceptance of the request for financing, the accounts receivable by a lender at a discount.

31. The computerized method of claim 29, wherein the lender receives payments associated with the purchased accounts receivable.

32. The computerized method of claim 23, wherein the inventory includes in-transit inventory.

33. The computerized method of claim 23, wherein the inventory includes inventory located in at least one of a warehouse, a bonded logistics park, or a free trade zone.

\* \* \* \* \*